US012613331B2

(12) United States Patent
Short, Jr. et al.

(10) Patent No.: US 12,613,331 B2
(45) Date of Patent: Apr. 28, 2026

(54) RF-SPECIFIC MATERIAL DETECTION DEVICE FOR AN APPLICATION-SPECIFIC DEVICE

(71) Applicant: QUANTUM IP, LLC, Stuart, FL (US)

(72) Inventors: Robert J. Short, Jr., Stuart, FL (US); Lee Duke, Stuart, FL (US)

(73) Assignee: QUANTUM IP, LLC, Stuart, FL (US)

( * ) Notice: Subject to any disclaimer, the term of this patent is extended or adjusted under 35 U.S.C. 154(b) by 0 days.

(21) Appl. No.: 18/929,189

(22) Filed: Oct. 28, 2024

(65) Prior Publication Data

US 2026/0009894 A1      Jan. 8, 2026

Related U.S. Application Data

(60) Provisional application No. 63/667,584, filed on Jul. 3, 2024.

(51) Int. Cl.
*G01S 13/88*      (2006.01)
*G08B 21/02*      (2006.01)
(52) U.S. Cl.
CPC ............ *G01S 13/887* (2013.01); *G08B 21/02* (2013.01)
(58) Field of Classification Search
CPC .... G06Q 10/08; G06Q 10/083; G06Q 50/265; B60P 1/00; G06V 2201/06;
(Continued)

(56) References Cited

U.S. PATENT DOCUMENTS 2,116,717 A      5/1938  Hans
3,725,917 A      4/1973  Sletten et al.
(Continued)

FOREIGN PATENT DOCUMENTS

CN      107102325      8/2017
CN      117091456      11/2023
(Continued)

OTHER PUBLICATIONS

A. S. Ibrahim, K. J. R. Liu, D. Novak and R. B. Waterhouse, "A Subspace Signal Processing Technique for Concealed Weapons Detection," 2007 IEEE International Conference on Acoustics, Speech and Signal Processing—ICASSP '07, Honolulu, HI, USA, 2007, pp. II-401-II-404, doi: 10.1109/ICASSP.2007.366257. (Year: 2007).*

(Continued)

*Primary Examiner* — Olumide Ajibade Akonai
(74) *Attorney, Agent, or Firm* — Polsinelli LLP

(57)      ABSTRACT

A method includes detecting an application-specific trigger for an application-specific apparatus; accessing a material database associating each of a set of materials with one or more corresponding resonance frequencies; and, for each material of the set of materials, transmitting, into a target associated with the application-specific apparatus, an RF signal at a first resonance frequency for a material of the set of materials; receiving a response signal from the target; analyzing the response signal for resonance characteristics that indicate a presence of the material in the target; and, in response to the presence of the material being indicated, determining whether an application-specific action is required; and if the application-specific action is required, actuating at least one integration communication apparatus associated with the application-specific apparatus to perform at least one application-specific task.

21 Claims, 4 Drawing Sheets

(58) Field of Classification Search
CPC ..... G06V 2201/05; G01S 17/89; G01S 17/87; G01S 2015/937; G01S 7/412; G01S 13/88; G01S 13/89; G01S 13/887; G01S 7/024; G01S 7/2806; G01S 7/292; G08B 21/02; G01R 29/085; G01V 3/12; G01V 3/08; G01V 3/101; G01V 3/14; G01V 3/32; H04B 5/70
USPC .......................................................... 342/27
See application file for complete search history.

(56) References Cited

U.S. PATENT DOCUMENTS

| | | | |
|---|---|---|---|
| 3,851,971 A | 12/1974 | Koch | |
| 3,983,558 A | 9/1976 | Rittenbach | |
| 4,132,943 A | 1/1979 | Gournay et al. | |
| 4,217,585 A | 8/1980 | Fishbein et al. | |
| 4,296,378 A | 10/1981 | King | |
| 4,514,691 A | 4/1985 | De Los Santos et al. | |
| 4,897,660 A | 1/1990 | Gold et al. | |
| 5,227,800 A | 7/1993 | Huguenin et al. | |
| 5,233,300 A | 8/1993 | Buess et al. | |
| 5,592,083 A | 1/1997 | Magnuson et al. | |
| 5,745,071 A | 4/1998 | Blackmon et al. | |
| 6,297,765 B1 | 10/2001 | Frazier et al. | |
| 6,359,582 B1 | 3/2002 | MacAleese et al. | |
| 6,900,633 B2 | 5/2005 | Sauer et al. | |
| 6,967,612 B1 | 11/2005 | Gorman et al. | |
| 7,251,310 B2 | 7/2007 | Smith | |
| 7,288,927 B2 | 10/2007 | Nutting et al. | |
| 7,405,692 B2 | 7/2008 | McMakin et al. | |
| 7,825,648 B2 | 11/2010 | Nutting et al. | |
| 8,138,770 B2 | 3/2012 | Pechmann et al. | |
| 8,188,862 B1 | 5/2012 | Tam et al. | |
| 8,242,447 B1 | 8/2012 | Chawla | |
| 8,242,450 B2 | 8/2012 | Gaziano | |
| 8,502,666 B1 | 8/2013 | Tam et al. | |
| 8,773,127 B2 | 7/2014 | Apostolos et al. | |
| 8,890,745 B2 | 11/2014 | Wahlquist et al. | |
| 9,182,481 B2 | 11/2015 | Bowring et al. | |
| 9,500,609 B1 | 11/2016 | Zank | |
| 9,857,462 B2* | 1/2018 | Kim ........................ G01S 7/354 | |
| 9,915,727 B1 | 3/2018 | Reznack et al. | |
| 10,204,775 B2 | 2/2019 | Brown et al. | |
| 10,229,328 B2 | 3/2019 | Nikolova et al. | |
| 10,268,889 B2 | 4/2019 | Brown et al. | |
| 10,816,658 B2 | 10/2020 | Frizzell | |
| 10,890,656 B2 | 1/2021 | Heinen | |
| 11,280,898 B2* | 3/2022 | Morton .................... G01V 3/10 | |
| 11,422,252 B2 | 8/2022 | Bowring et al. | |
| 11,493,494 B2 | 11/2022 | Wilson et al. | |
| 12,248,062 B1 | 3/2025 | Short et al. | |
| 12,360,234 B1 | 7/2025 | Short et al. | |
| 12,372,480 B1 | 7/2025 | Short et al. | |
| 12,379,439 B1 | 8/2025 | Short et al. | |
| 12,386,037 B1 | 8/2025 | Short et al. | |
| 12,451,217 B1 | 10/2025 | Short, Jr. et al. | |
| 12,455,332 B1 | 10/2025 | Short, Jr. et al. | |
| 12,517,066 B1 | 1/2026 | Short, Jr. et al. | |
| 2002/0008655 A1 | 1/2002 | Haj-Yousef | |
| 2003/0196543 A1 | 10/2003 | Moser et al. | |
| 2004/0039713 A1* | 2/2004 | Beck ........................ B07C 1/00 705/406 | |
| 2004/0125020 A1 | 7/2004 | Hendler et al. | |
| 2004/0155650 A1 | 8/2004 | Plaas-Link et al. | |
| 2004/0232054 A1* | 11/2004 | Brown .................... G01V 5/20 209/552 | |
| 2004/0252062 A1 | 12/2004 | Tracy et al. | |
| 2005/0081634 A1 | 4/2005 | Matsuzawa | |
| 2005/0200528 A1 | 9/2005 | Carrender et al. | |
| 2005/0230604 A1 | 10/2005 | Rowe et al. | |
| 2005/0258235 A1 | 11/2005 | Silverbrook et al. | |
| 2006/0008051 A1 | 1/2006 | Heaton et al. | |
| 2006/0038563 A1 | 2/2006 | Chrisholm et al. | |
| 2007/0074580 A1 | 4/2007 | Fallah-Rad et al. | |

| | | | |
|---|---|---|---|
| 2007/0115183 A1 | 5/2007 | Kim et al. | |
| 2007/0188377 A1 | 8/2007 | Krikorian et al. | |
| 2008/0283761 A1 | 11/2008 | Robinson et al. | |
| 2009/0085565 A1 | 4/2009 | Fullerton | |
| 2009/0085582 A1 | 4/2009 | Sinha | |
| 2009/0195435 A1 | 8/2009 | Kapilevich et al. | |
| 2009/0222446 A1 | 9/2009 | Goldschmidt et al. | |
| 2009/0262005 A1 | 10/2009 | McNeill et al. | |
| 2010/0046704 A1* | 2/2010 | Song ...................... G01N 23/04 378/57 | |
| 2010/0079280 A1 | 4/2010 | Lacaze et al. | |
| 2010/0128852 A1* | 5/2010 | Yamamoto ................ G01T 1/00 250/252.1 | |
| 2010/0134102 A1 | 6/2010 | Crowley | |
| 2010/0134254 A1 | 6/2010 | Kim | |
| 2010/0164831 A1 | 7/2010 | Rentz et al. | |
| 2010/0182594 A1 | 7/2010 | Carron | |
| 2011/0050241 A1 | 3/2011 | Nutting et al. | |
| 2011/0233419 A1 | 9/2011 | Norris | |
| 2011/0284742 A1 | 11/2011 | Barker et al. | |
| 2012/0206141 A1 | 8/2012 | Apostolos et al. | |
| 2012/0248313 A1 | 10/2012 | Karam et al. | |
| 2012/0256779 A1* | 10/2012 | Nguyen ............... G01S 13/887 342/90 | |
| 2014/0050372 A1 | 2/2014 | Qi et al. | |
| 2014/0154788 A1 | 6/2014 | Omenetto et al. | |
| 2015/0160181 A1 | 6/2015 | White et al. | |
| 2015/0250388 A1 | 9/2015 | Arbabian et al. | |
| 2016/0011307 A1 | 1/2016 | Casse et al. | |
| 2016/0047757 A1 | 2/2016 | Kuznetsov et al. | |
| 2016/0124071 A1 | 5/2016 | Baxley et al. | |
| 2016/0166843 A1 | 6/2016 | Casse et al. | |
| 2016/0178601 A1 | 6/2016 | Harrison | |
| 2016/0195608 A1 | 7/2016 | Ruenz | |
| 2016/0223666 A1* | 8/2016 | Kim ........................ G01S 7/025 | |
| 2016/0274230 A1 | 9/2016 | Wu et al. | |
| 2016/0327634 A1 | 11/2016 | Katz et al. | |
| 2017/0011255 A1 | 1/2017 | Kaditz et al. | |
| 2017/0350834 A1 | 12/2017 | Prado et al. | |
| 2018/0067204 A1 | 3/2018 | Frizzell | |
| 2018/0285640 A1 | 10/2018 | Brown et al. | |
| 2019/0137653 A1 | 5/2019 | Starr et al. | |
| 2019/0154439 A1 | 5/2019 | Binder | |
| 2019/0208112 A1 | 7/2019 | Kleinbeck | |
| 2019/0219687 A1 | 7/2019 | Baheti et al. | |
| 2019/0257771 A1 | 8/2019 | Desmulliez et al. | |
| 2020/0166634 A1 | 5/2020 | Peleg | |
| 2020/0173970 A1 | 6/2020 | Wilson et al. | |
| 2020/0264298 A1 | 8/2020 | Haseltine et al. | |
| 2020/0333412 A1 | 10/2020 | Nichols et al. | |
| 2020/0371227 A1 | 11/2020 | Malhi | |
| 2021/0041376 A1 | 2/2021 | Ashiwal et al. | |
| 2021/0096240 A1 | 4/2021 | Padmanabhan et al. | |
| 2021/0312201 A1 | 10/2021 | Hastings et al. | |
| 2021/0373098 A1 | 12/2021 | Fraundorfer et al. | |
| 2021/0389321 A1 | 12/2021 | Kaushik et al. | |
| 2022/0011401 A1* | 1/2022 | Dolgin .................... H04B 5/70 | |
| 2022/0171017 A1* | 6/2022 | McFadden ............ G01S 7/2813 | |
| 2022/0265882 A1* | 8/2022 | Lemchen ................. A61L 2/28 | |
| 2022/0311135 A1 | 9/2022 | Guo et al. | |
| 2022/0365168 A1 | 11/2022 | Amizur et al. | |
| 2022/0408643 A1 | 12/2022 | Somarowthu et al. | |
| 2023/0243761 A1 | 8/2023 | Somarowthu et al. | |
| 2023/0375695 A1 | 11/2023 | Tan | |
| 2024/0036166 A1 | 2/2024 | Geng et al. | |
| 2024/0372600 A1 | 11/2024 | Schreck et al. | |
| 2026/0009740 A1 | 1/2026 | Short, Jr. et al. | |
| 2026/0009741 A1 | 1/2026 | Short, Jr. et al. | |
| 2026/0009893 A1 | 1/2026 | Short, Jr. et al. | |
| 2026/0009895 A1 | 1/2026 | Short, Jr. et al. | |
| 2026/0009896 A1 | 1/2026 | Short, Jr. et al. | |
| 2026/0011201 A1 | 1/2026 | Short, Jr. et al. | |
| 2026/0011229 A1 | 1/2026 | Short, Jr. et al. | |

(56) References Cited

U.S. PATENT DOCUMENTS

| | | | |
|---|---|---|---|
| 2026/0036658 A1 | 2/2026 | Short, Jr. et al. | |
| 2026/0043900 A1 | 2/2026 | Short, Jr. et al. | |

FOREIGN PATENT DOCUMENTS

| | | | | | |
|---|---|---|---|---|---|
| EP | 2960685 A2 | * | 12/2015 | .......... | G01S 13/887 |
| JP | 2014095625 | | 5/2014 | | |
| WO | WO-0075892 A2 | * | 12/2000 | .......... | G01S 13/887 |
| WO | WO 2024091157 | | 5/2024 | | |
| WO | 2026010635 A1 | | 1/2026 | | |
| WO | 2026015361 A1 | | 1/2026 | | |

OTHER PUBLICATIONS

PCT Application No. PCT/US2024/039348, International Search Report and Written Opinion dated Oct. 17, 2024.

U.S. Appl. No. 18/921,840, US, Robert J. Short Jr., RF-Based Material Detection Device That Uses Specific Antennas Designed for Specific Substances, filed Oct. 21, 2024.

U.S. Appl. No. 18/922,682, US, Robert J. Short Jr., Enhanced Antenna Materials for Low-Frequency Detection of Materials, filed Oct. 22, 2024.

U.S. Appl. No. 18/922,693, US, Robert J. Short Jr., Dynamic Phased Array Resonator Systems and Methods for Determining a Material Substance, filed Oct. 22, 2024.

U.S. Appl. No. 18/923,518, US, Robert J. Short Jr., Currency RF-Based Verification Device, Oct. 22, 2024.

U.S. Appl. No. 18/922,702, US, Robert J. Short Jr., Enhanced Material Detection and Frequency Sweep Analysis of Controlled Substances Via Digital Signal Processing, Oct. 22, 2024.

U.S. Appl. No. 18/922,729, US, Robert J. Short Jr., RF-Based Detection Device for Material Identification Using a Smart Frequency Selection Method, Oct. 22, 2024.

U.S. Appl. No. 18/782,964, US, Robert J. Short Jr., RF-Based Material Identification Systems and Methods, Jul. 24, 2024.

PCT/US2024/039348, WO, Robert J. Short Jr., RF-Based Material Identification Systems and Methods, Jul. 24, 2024.

U.S. Appl. No. 18/934,569, US, Robert J. Short Jr., Networked RF Material Devices for Substance Detection Via Opposed Perimeter Sensors, Nov. 1, 2024.

U.S. Appl. No. 18/939,132, US, Robert J. Short Jr., RF Material Detection Device With Smart Scanning Multiple Axis Gimbal Integrated With Haptics, Nov. 6, 2024.

U.S. Appl. No. 18/938,584, US, Robert J. Short Jr., RF Transmit and Receiver Antenna Detector System, Nov. 6, 2024.

U.S. Appl. No. 18/936,177, US, Robert J. Short Jr., Method and System for Detecting and Quantifying Specific Substances, Elements, or Conditions Utilizing an AI Module, Nov. 4, 2024.

U.S. Appl. No. 18/942,906, US, Robert J. Short Jr., RF-Specific Material Detection Device Integrated Into Application-Specific Drone Device, Nov. 11, 2024.

U.S. Appl. No. 18/936,500, US, Robert J. Short Jr., RF-Based Special Material Detection System With Secure Multi-Dimensional Authentication, Nov. 4, 2024.

U.S. Appl. No. 18/938,691, US, Robert J. Short Jr., RF-Based AI Determination of Materials by Cycling Through Detection Patterns for Specific Applications, Nov. 6, 2024.

U.S. Appl. No. 18/946,014, US, Robert J. Short Jr., RF-Based Special Material Detection Securing Entry Points and Access, Nov. 13, 2024.

U.S. Appl. No. 18/922,693, Non-Final Office Action dated Nov. 26, 2024.

U.S. Appl. No. 18/922,729, Non-Final Office Action dated Dec. 16, 2024.

U.S. Appl. No. 18/782,964, Non-Final Office Action dated Dec. 6, 2024.

U.S. Appl. No. 18/939,132, Non-Final Office Action dated Dec. 26, 2024.

U.S. Appl. No. 18/936,177, Non-Final Office Action dated Jan. 21, 2025.

U.S. Appl. No. 18/936,500, Non-Final Office Action dated Dec. 23, 2024.

U.S. Appl. No. 18/946,014, Non-Final Office Action dated Jan. 16, 2025.

Erricolo et al., "Machine Learning in Electromagnetics: A Review and Some Perspectives for Future Research," 2019 International Conference on Electromagnetics in Advanced Applications (ICEAA), Granada, Spain, 2019, pp. 1377-1380, doi: 10.1109/ICEAA.2019. 8879110.

Itozaki et al., "Nuclear Quadrupole Resonance for Explosive Detection," International Journal on Smart Sensing and Intelligent Systems, vol. 1, No. 3, Sep. 2008.

U.S. Appl. No. 18/921,840, Non-Final Office Action dated Feb. 28, 2025.

U.S. Appl. No. 18/922,693, Final Office Action dated Mar. 17, 2025.

U.S. Appl. No. 18/938,584, Non-Final Office Action dated Feb. 24, 2025.

U.S. Appl. No. 18/922,693, Non-Final Office Action dated Jun. 4, 2025.

U.S. Appl. No. 19/268,204, Non-Final Office Action dated Aug. 13, 2025.

U.S. Appl. No. 19/279,049, Non-Final Office Action dated Aug. 22, 2025.

U.S. Appl. No. 19/074,744, US, Robert J. Short Jr., Enhanced Material Detection and Frequency Sweep Analysis of Controlled Substances Via Digital Signal Processing, Mar. 10, 2025.

U.S. Appl. No. 19/296,137, US, Robert J. Short Jr., RF Based Detection Device for Material Identification Using a Smart Frequency Selection Method, Aug. 11, 2025.

PCT/US25/36316, WO, Robert J. Short Jr., RF-Specific Material Detection Device for an Application-Specific Device, Jul. 2, 2025.

U.S. Appl. No. 19/268,204, US, Robert J. Short Jr., RF-Based Material Dentification Systems and Methods, Jul. 14, 2025.

U.S. Appl. No. 19/290,051, US, Robert J. Short Jr., RF Material Detection Device With Smart Scanning Multiple Axis Gimbal Integrated With Haptics, Aug. 4, 2025.

U.S. Appl. No. 19/370,609, US, Robert J. Short Jr., RF Transmit and Receiver Antenna Detector System, Oct. 27, 2025.

U.S. Appl. No. 19/364,892, US, Robert J. Short Jr., Method and System for Detecting and Quantifying Specific Substances, Elements, or Conditions Utilizing an AI Module, Oct. 21, 2025.

PCT/US25/36318, WO, Robert J. Short Jr., Method and System for Detecting and Quantifying Specific Substances, Elenfents, or Conditions Utilizing an AI Module, Jul. 2, 2025.

U.S. Appl. No. 19/279,049, US, Robert J. Short Jr., RF-Based Special Material Detection System With Secure Multi-Dimensional Authentication, Jul. 24, 2025.

PCT/US25/36330, WO, Robert J. Short Jr., RF-Based Special Material Detection Securing Entry Points and Access, Jul. 2, 2025.

PCT Application No. PCT/US2025/036318, International Search Report and Written Opinion dated Aug. 26, 2025.

U.S. Appl. No. 18/946,014, Final Office Action dated Sep. 10, 2025.

U.S. Appl. No. 18/923,518, Non-Final Office Action dated Nov. 19, 2025.

U.S. Appl. No. 19/441,480 filed Jan. 6, 2026.

U.S. Appl. No. 18/922,693, Final Office Action dated Dec. 22, 2025.

* cited by examiner

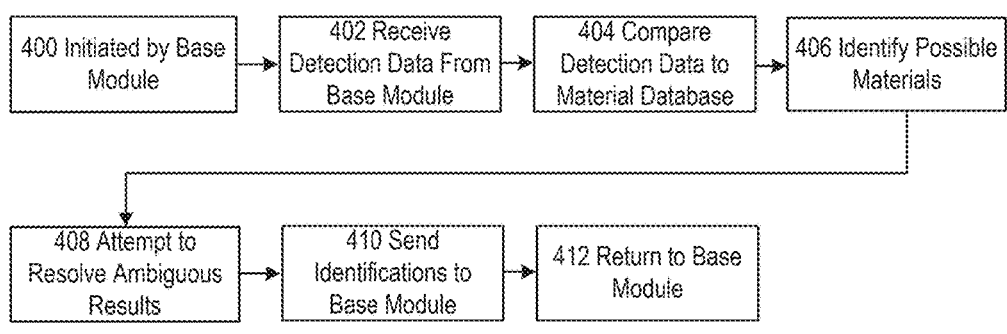
FIG. 4
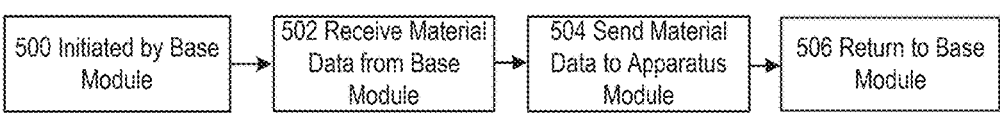
FIG. 5
| Frequency | Resonant Materials | App. A Priority Tier | App. B Priority Tier | ... | App. N Priority Tier |
|---|---|---|---|---|---|
| 33 Hz | Arsenic (As) | 1 | 2 | ... | 1 |
| 42 Hz | As | 1 | 2 | ... | 1 |
| 75 Hz | As | 1 | 2 | ... | 1 |
| 92 Hz | Uranium (U) | 2 | 1 | ... | 2 |
| 160 Hz | O2, CH4 | 3 | 3 | ... | 1 |
| 180 Hz | HCl, H202 | 1 | 1 | ... | 1 |
| 235 Hz | U(235) | 2 | 1 | ... | 2 |
| 238 Hz | U(238) | 2 | 1 | ... | 2 |
| 340 Hz | H202 | 1 | 1 | ... | 3 |
| 360 Hz | HCl | 3 | 1 | ... | 3 |
| 1160 Hz | CH2NO3CHNO3CH2NO3 | 3 | 1 | ... | 4 |
| 28,430 Hz | Prostate-Specific Antigen | 1 | - | ... | 2 |
| 200 GHz | Cancer Antigen 125 | 1 | - | ... | 2 |
| 69 GHz | Alpha-fetoprotein | 1 | - | ... | 2 |
| 36.7 GHz | Gondotropin | 1 | - | ... | 2 |
| 180 GHz | Carcinoembryonic Antigen | 1 | - | ... | 2 |
| - | - | - | - | ... | - |
| - | - | - | - | ... | - |
FIG. 6

RF-SPECIFIC MATERIAL DETECTION DEVICE FOR AN APPLICATION-SPECIFIC DEVICE

CROSS-REFERENCE TO RELATED APPLICATIONS

This application claims the benefit of U.S. Provisional Application No. 63/667,584, filed Jul. 3, 2024, which is incorporated herein by reference.

FIELD OF THE DISCLOSURE

The present disclosure is generally related to RF-based material identification and, more specifically, to an RF-specific material detection device for an application-specific device.

BACKGROUND

The current methods for detecting hazardous materials in cargo containers often involve manual inspections or high-powered scanning technologies that can be time-consuming, invasive, and prone to human error, leading to inefficient and sometimes inaccurate screening processes.

Detecting hazardous materials in mail trucks is challenging due to the high volume of packages and the variety of materials, which can obscure or interfere with traditional detection methods, resulting in potential security risks and undetected threats.

Airport luggage screening systems often rely on high-powered X-ray or CT scanners, which may not effectively differentiate between harmless and hazardous materials at the molecular level, leading to false positives, delays, and compromised security.

SUMMARY

According to one aspect, a method includes detecting an application-specific trigger for an application-specific apparatus. The method also includes accessing a material database associating each of a set of materials with one or more corresponding resonance frequencies. The method further includes, for each material of the set of materials, transmitting, into a target associated with the application-specific apparatus, an RF signal at a first resonance frequency for a material of the set of materials; receiving a response signal from the target; analyzing the response signal for resonance characteristics that indicate a presence of the material in the target; and in response to the presence of the material being indicated: determining whether an application-specific action is required; and if the application-specific action is required, actuating at least one integration communication apparatus associated with the application-specific apparatus to perform at least one application-specific task.

In some embodiments, the application-specific apparatus includes a cargo crane, and wherein detecting the application-specific trigger includes detecting a coupling of the cargo crane to a cargo container.

In some embodiments, the application-specific apparatus includes a loading dock, and wherein detecting the application-specific trigger includes detecting a truck approaching the loading dock.

In some embodiments, the application-specific apparatus includes a mail-handling system, and wherein detecting the application-specific trigger includes detecting a piece of mail passing through the mail-handling system.

In some embodiments, the application-specific apparatus includes a luggage-handling system, and wherein detecting the application-specific trigger includes detecting a piece of luggage passing through the luggage-handling system.

In some embodiments, the at least one integration communication apparatus includes an alarm, and wherein the method further includes activating the alarm in response to a hazardous material being detected in the target.

In some embodiments, the at least one integration communication apparatus includes an automated gate, and wherein the method further includes closing the automated gate in response to a hazardous material being detected in the target.

In some embodiments, the at least one integration communication apparatus includes an automated gate, and wherein the method further includes opening the automated gate in response to a hazardous material not being detected in the target.

In some embodiments, the at least one integration communication apparatus includes a mechanical arm, and wherein the method further includes actuating the mechanical arm to redirect one of a package or luggage into a quarantine zone in response to a hazardous material being detected in the target.

In some embodiments, wherein determining whether the application-specific action is required includes determining whether the application-specific action is required based on the application-specific apparatus and/or the material.

According to another aspect, a system includes an application-specific apparatus including an integration communication apparatus. The system also includes one or more processors and a non-transitory computer-readable medium including program instructions that, when executed by the one or more processors, perform a method including detecting an application-specific trigger for the application-specific apparatus; accessing a material database associating each of a set of materials with one or more corresponding resonance frequencies, and, for each material of the set of materials, transmitting, into a target associated with the application-specific apparatus, an RF signal at a first resonance frequency for a material of the set of materials; receiving a response signal from the target; analyzing the response signal for resonance characteristics that indicate a presence of the material in the target; and in response to the presence of the material being indicated: determining whether an application-specific action is required; and, if the application-specific action is required, actuating at least one integration communication apparatus associated with the application-specific apparatus to perform at least one application-specific task.

In some embodiments, the application-specific apparatus includes a cargo crane, and wherein the application-specific trigger includes coupling of the cargo crane to a cargo container.

In some embodiments, the application-specific apparatus includes a loading dock, and wherein the application-specific trigger includes detection of a truck approaching the loading dock.

In some embodiments, the application-specific apparatus includes a mail-handling system, and wherein the application-specific trigger includes detection of a piece of mail passing through the mail-handling system.

In some embodiments, the application-specific apparatus includes a luggage-handling system, and wherein the application-specific trigger includes detection of a piece of luggage passing through the luggage-handling system.

In some embodiments, the at least one integration communication apparatus includes an alarm, and wherein the at least one application-specific task includes activating the alarm in response to a hazardous material being detected in the target.

In some embodiments, the at least one integration communication apparatus includes an automated gate, and wherein the at least one application-specific task includes closing the automated gate in response to a hazardous material being detected in the target.

In some embodiments, the at least one integration communication apparatus includes an automated gate, and wherein the at least one application-specific task includes opening the automated gate in response to a hazardous material not being detected in the target.

In some embodiments, the at least one integration communication apparatus includes a mechanical arm, and wherein the at least one application-specific task includes actuating the mechanical arm to redirect one of a package or luggage into a quarantine zone in response to a hazardous material being detected in the target.

In some embodiments, wherein determining whether the application-specific action is required includes determining whether the application-specific action is required based on the application-specific apparatus and/or the material.

BRIEF DESCRIPTION OF THE DRAWINGS

FIG. 4 is a flow chart of a method performed by a Determination Module, according to an embodiment.

FIG. 5 is a flow chart of a method performed by a Reporting Module, according to an embodiment.

FIG. 6 illustrates a Material Database, according to an embodiment.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
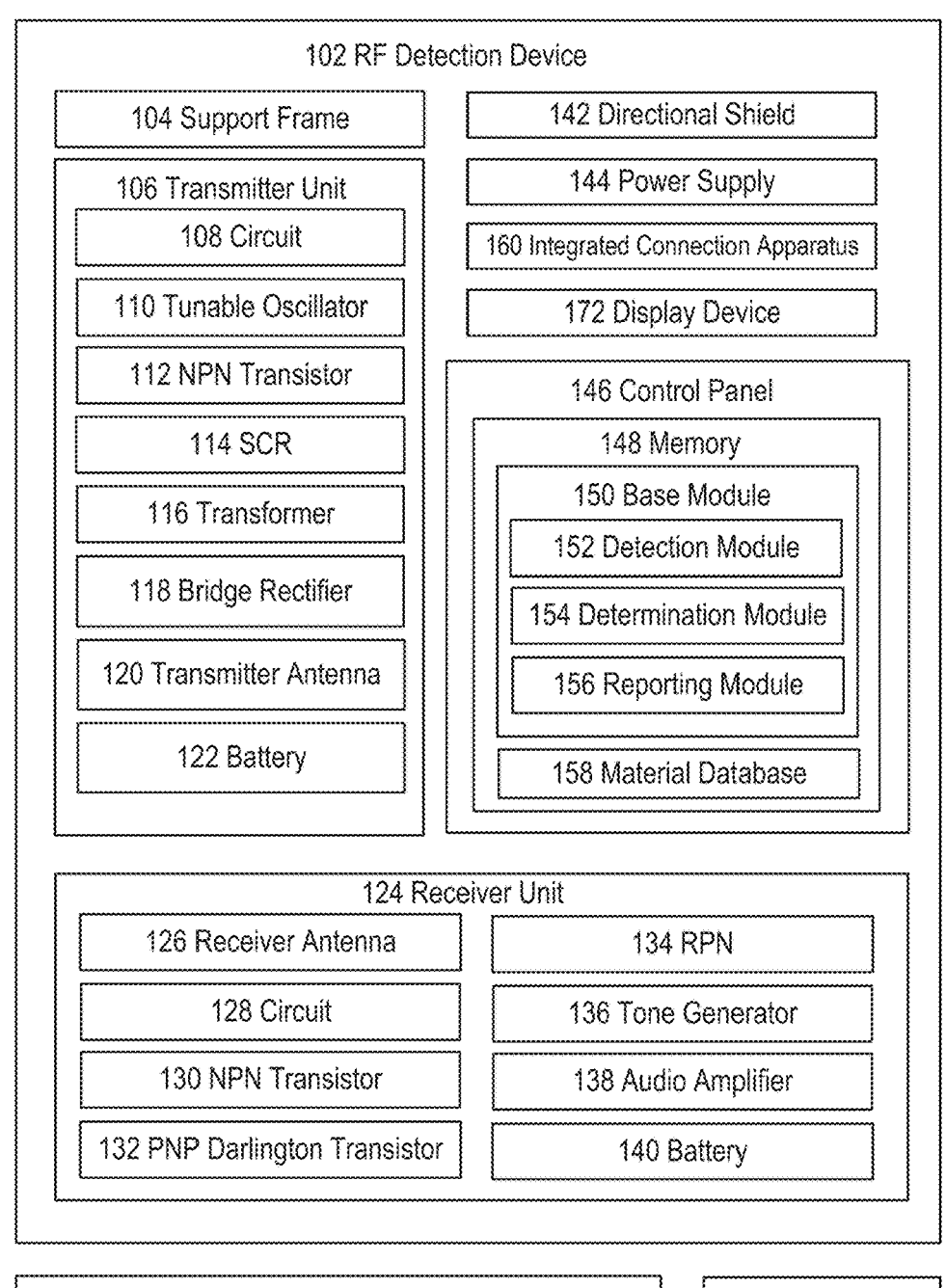
FIG. 1 is a schematic diagram of an RF detection system, according to an embodiment.

FIG. 1 illustrates an RF detection device 102, which may be a specialized system designed to detect and identify specific materials based on their unique resonance frequencies when exposed to electromagnetic signals. The RF detection device 102 incorporates an RF detection system similar to that disclosed in U.S. Pat. No. 11,493,494B2, employing RF signals for the detection and identification of materials based on their resonance characteristics. The RF detection device 102 may operate by transmitting RF signals into the environment and analyzing the received signals for resonance characteristics that indicate the presence of a target material. The RF detection device 102 may be designed to detect a target material based on its resonance properties with specific RF frequencies. It utilizes the principle that materials resonate at particular frequencies when exposed to external RF signals, allowing for their identification and potential quantification. The RF detection device 102 may include a transmitter unit 106, a receiver unit 124, a control panel 146, a transmitter antenna 120, a receiver antenna 126, a directional shield 142, and a power supply 144. Upon activation, the control panel 146 initializes the system, powering up the transmitter unit 106, the receiver unit 124, and associated electronics. The control panel 146 may instruct the transmitter unit 106 to generate RF signals at specified frequencies, such as 180 Hz, 1800 Hz, etc., and amplitudes, such as 320V, 160V, etc., known to resonate with a target material. The transmitter unit 106 emits these RF signals through the transmit antenna 120 into the testing environment. The receiver unit 124 captures the RF signals using the receive antenna 126. It then processes the received signals to identify resonance frequencies that indicate the presence of the target material.

Further, embodiments may include a support frame 104, which may be a structural component designed to provide stability and support to various subsystems and components of the RF detection device 102. The support frame 104 may provide proper alignment and positioning of the components, such as the transmitter unit 106, the receiver unit 124, antennas 120, 126, and control panel 146. The support frame 104 may provide mounting points and secure attachment locations for subsystems such as the transmitter unit 106, the receiver unit 124, antennas 120, 126, and control panel 146. By maintaining precise alignment and stability, the support frame 104 may minimize vibrations and unwanted movements that could interfere with the accuracy of RF signal transmission and reception. In some embodiments, the support frame 104 may be constructed from durable materials such as metal alloys or rigid polymers.

Further, embodiments may include a transmitter unit 106, which may include an electronic circuit 108, powered by a battery, such as a 12-volt, 1.2 amp battery, with a regulated output of nine volts. The circuit 108 may use a 555 timer as a tunable oscillator to generate a pulse rate. The output of the oscillator is fed in parallel to an NPN transistor 112 and a silicon-controlled rectifier (SCR) 114. The transistor may be used as a common emitter amplifier stage driving a transformer 116. The transformer 116 may be used to step up the voltage as needed. The balanced output of the transformer 116 feeds a bridge rectifier 118. The rectified direct current flows through a 100 K, three-watt resistor to terminal B of the transmitter antenna 120. A plurality of resistors and capacitors may fill in the circuit 108. In some embodiments, the transmitter antenna 120 may be formed from a coil of about 25 meters of 14-strand wire tightly wound around a one-centimeter PVC core. The transmitter antenna 120 may be, in one exemplary embodiment, in a 1"×3" configuration at the bottom end of the support frame 104. In some embodiments, the transmitter antenna 120 may be shielded approximately 315 degrees with the directional shield 142, formed from aluminum and copper, leaving a two-inch opening. Terminal A of the transmitter antenna 120 is switched to ground through the SCR 114. The SCR 114 is "fired" by the output of the 555 timer. This particular configuration generates a narrow-pulsed waveform to the transmitter antenna 120 at a pulse rate as set by the 555 timer. Power is delivered through the 3 W resistor. Frequencies down to 4 Hz are achieved by an RC network containing a 100 K pot, a switch, and one of two capacitive paths. The circuit 108 may provide simple RC-controlled timing and deliver pulses to the primary of a step-up transformer 116, the output of which is full-wave rectified and fed to the transmitter antenna 120. The pulse rate is adjustable from the low Hz range to the low kHz range. The sharp pulses at low repetition frequencies yield a wide spectrum of closely spaced lines. The pulse rate is adjusted depending on the material to be detected. In some embodiments, one or more portions of the transmitter unit 106 may be implemented in an analog circuit configuration, a digital circuit configuration, or some combination thereof. In one example, the analog configuration may include one or more analog circuit components, such as, but not limited to, operational amplifiers, op-amps, resistors, inductors, and capacitors. In another example, the digital configuration may include one or more digital circuit components, such as, but not limited to, microprocessors, logic gates, and transistor-based switches. In some instances, a given logic gate may include one or more electronically controlled switches, such as transistors, and the output of a first logic gate may control one or more logic gates disposed "downstream" from the first logic gate.

Further, embodiments may include a circuit 108, which may be an assembly of electronic components that generate, modulate, and transmit radio frequency, RF signals. The circuit 108 may include oscillators, amplifiers, modulators, and other components that work together to produce a specific RF signal, which can then be transmitted through the transmitter antenna 120. The circuit 108 may include an oscillator, which generates a stable RF signal at a specified frequency. This frequency is selected based on the resonance characteristics of the target material. For example, the system may operate at 180 Hz or 1800 Hz, depending on the specific requirements of the detection task. Once generated, the RF signal is fed into an amplifier. The amplifier boosts the signal strength to a level suitable for transmission over the required distance. This ensures that the signal can propagate through various media and reach the receiver unit effectively. Modulation circuits are used to encode information into the RF signal. This may involve varying the amplitude, frequency, or phase of the signal to carry specific data related to the detection process. Modulation ensures that the transmitted signal can be uniquely identified and distinguished from other signals in the environment. The circuit 108 may include power control components that regulate the voltage and current supplied to the oscillator and amplifier. This ensures consistent signal output and helps in managing the power consumption of the device. In some embodiments, the transmitter may operate at voltages such as 160V and 320V, with adjustments made to optimize detection performance. The amplified and modulated RF signal is then routed to the transmitter antenna 120. The transmitter antenna 120 converts the electrical signal into an electromagnetic wave that can propagate through the air or other media. In some embodiments, the circuit 108 may be integrated with the device's control systems, allowing for automated adjustments based on pre-set parameters or operator inputs.

Further, embodiments may include a tunable oscillator 110, which may be a type of electronic component that generates a periodic waveform with a frequency that can be adjusted or tuned over a specific range. The tunable oscillator 110 within the transmitter unit 106 may be utilized to generate the RF signal that will be transmitted by the RF detection device 102. The tunable oscillator 110 in the transmitter unit 106 may be employed to produce an RF signal whose frequency can be precisely controlled. By adjusting the control inputs, the frequency of the output signal can be varied, allowing the system to adapt to different detection requirements and environmental conditions. This tuning mechanism may ensure that the oscillator produces a signal at the correct frequency needed for effective resonance with the target materials. By tuning the oscillator to specific frequencies, the system may detect various materials based on their unique resonant properties. The tunable oscillator 110 may work in conjunction with the control panel 146, which sends control signals to adjust the oscillator's frequency as needed. The tunable oscillator 110 may act as the core signal generation component in the transmitter unit 106. When the control panel 146 determines the required frequency for detection, it sends control signals to the tunable oscillator 110. The oscillator then adjusts its frequency, accordingly, generating an RF signal that matches the desired parameters. The tunable oscillator 110 may be connected to other components within the transmitter unit 106, such as the SCR 114 and the transformer 116. The SCR 114 manages the power supply to the oscillator, ensuring it receives the correct voltage. The transformer 116 steps up the voltage to the appropriate level required by the oscillator.

Further, embodiments may include an NPN transistor 112, which may be a type of bipolar junction transistor, BJT, that consists of three layers of semiconductor material: a layer of p-type material, the base layer, sandwiched between two layers of n-type material, the emitter and the collector. When a small current flows into the base, it allows a larger current to flow from the collector to the emitter, effectively acting as a current amplifier or switch in electronic circuits. The NPN transistor 112 in the transmitter unit 106 amplifies the RF signal generated by the oscillator. The NPN transistor 112 may operate in its active region, where a small input current applied to the base controls a larger current flowing from the collector to the emitter. This amplification process ensures that the RF signal reaches a sufficient power level for effective transmission. In some embodiments, the NPN transistor 112 may also function as a switch, controlling the flow of current within the circuit 108. When the base-emitter junction is forward-biased, a small voltage is applied, the NPN transistor 112 allows current to flow from the collector to the emitter. This switching action is used to modulate the RF signal, encoding information onto the carrier wave as required for the detection process. Proper biasing of the NPN transistor 112 is useful for stable operation. In some embodiments, resistors may be used to establish the correct biasing conditions to ensure that the NPN transistor 112 operates in its linear region for amplification or in saturation/cutoff regions for switching. The biasing circuit ensures that the NPN transistor 112 responds predictably to input signals, maintaining signal integrity. In some embodiments, the NPN transistor 112 may be involved in modulating the RF signal. By varying the input current to the base, the amplitude, frequency, or phase of the RF signal can be modulated. This modulation is critical for encoding the detection data onto the transmitted signal, allowing for accurate chemical identification and analysis. In some embodiments, the NPN transistor 112 may be integrated into the broader transmitter circuit 108, working in conjunction with other components such as capacitors, inductors, and resistors. This integration ensures that the NPN transistor's 112 amplification and switching actions are synchronized with the overall signal generation and transmission process. The circuit 108 design may leverage the NPN transistor's 112 properties to achieve the desired RF output characteristics.

Further, embodiments may include an SCR 114 or silicon-controlled rectifier, which may be a type of semiconductor device that functions as a switch and rectifier, allowing current to flow only when a control voltage is applied to its gate terminal. The silicon-controlled rectifier, SCR, 114, is utilized within the transmitter unit 106 to manage and control the power delivery to the RF signal generation components. The SCR 114 in the transmitter unit 106 may be employed to control the flow of power to the RF oscillator circuit. By applying a gate signal to the SCR 114, it switches from a non-conductive state to a conductive state, allowing current to pass through and power the oscillator. This control mechanism ensures that the oscillator only receives power when required, thereby conserving energy and preventing unnecessary power dissipation. The SCR 114 may act as a switching element in the transmitter unit 106. When the control panel 146 determines that the RF signal needs to be generated, a gate voltage is applied to the SCR 114. This triggers the SCR 114 to conduct, completing the circuit and enabling current to flow to the RF oscillator. The SCR 114 may ensure that sufficient current is supplied to the oscillator to produce a strong RF signal without being damaged by the high power levels. The gate terminal of the SCR 114 may be connected to the control panel 146, which manages the timing and application of the gate signal. This integration ensures that the SCR 114 is activated precisely when the RF signal needs to be transmitted, in sync with the overall operation of the detection system. The control panel 146 sends the appropriate signal to the SCR 114, ensuring accurate timing and efficient power usage. The SCR 114 may also serve as a protective component in the transmitter unit 106. By controlling the power flow, it prevents overloading and potential damage to the RF oscillator and other sensitive components. If the system detects any abnormal conditions, the control panel 146 can withhold the gate signal, keeping the SCR 114 in a non-conductive state and thereby cutting off power to protect the circuit.

Further, embodiments may include a transformer 116, which is an electrical device that transfers electrical energy between two or more circuits through electromagnetic induction. The transformer 116 is utilized within the transmitter unit 106 to manage and control the voltage levels required for the RF signal generation and transmission. The transformer 116 in the transmitter unit 106 may be employed to step up or down the voltage as needed to ensure the proper operation of the RF oscillator circuit. By adjusting the voltage levels, the transformer 116 ensures that the components within the transmitter unit receive the appropriate voltage for efficient functioning. The transformer 116 may act as a voltage regulation element in the transmitter unit 106. When the control panel 146 determines that the RF signal needs to be generated, the transformer 116 adjusts the input voltage to the desired level. This adjustment involves converting the primary winding voltage to a higher or lower voltage in the secondary winding, depending on the requirements of the RF oscillator. The transformer ensures that the oscillator receives a stable and appropriate voltage, which is critical for producing a consistent and strong RF signal. The primary winding of the transformer 116 may be connected to the power supply 144, while the secondary winding is connected to the RF oscillator circuit. This integration ensures that the transformer 116 can effectively manage the voltage levels needed for RF signal generation. The control panel 146 monitors and regulates the input voltage to the transformer 116, ensuring accurate and efficient voltage conversion and delivery to the RF oscillator.

Further, embodiments may include a bridge rectifier 118, which is an electrical device designed to convert alternating current, AC, to direct current, DC, using a combination of four diodes arranged in a bridge configuration. The bridge rectifier 118 is utilized within the transmitter unit 106 to ensure that the RF signal generation components receive a steady and reliable DC power supply. The bridge rectifier 118 in the transmitter unit 106 may be employed to convert the incoming AC voltage from the power supply into a DC voltage. By using all portions of the AC waveform, the bridge rectifier 118 provides full-wave rectification, resulting in a more efficient conversion process and producing a smoother and more stable DC output. The bridge rectifier 118 may act as a power conversion element in the transmitter unit 106. When the control panel 146 determines that the RF signal needs to be generated, the AC voltage supplied to the transmitter unit is passed through the bridge rectifier 118. The rectifier converts the AC voltage into a DC voltage by directing the positive and negative halves of the AC waveform through the appropriate diodes. This process results in a continuous DC voltage output that is used to power the RF oscillator and other critical components. The input terminals of the bridge rectifier 118 may be connected to the AC power supply, while the output terminals provide the rectified DC voltage to the RF oscillator circuit. This integration ensures that the bridge rectifier 118 can effectively convert and deliver the required DC power for RF signal generation. The control panel 146 monitors the output of the bridge rectifier, ensuring that the DC voltage is stable and within the desired range for optimal performance.

Further, embodiments may include a transmitter antenna 120, which may be a device that radiates radio frequency, RF, signals generated by the transmitter unit 106 towards a target material. The transmitter antenna 120 may be designed to efficiently transmit the generated RF signals into the surrounding environment and ensure the signals reach the intended target with minimal loss. The transmitter antenna 120 may be responsible for the emission of RF signals for detecting materials at a distance. In some embodiments, the transmitter antenna 120 may operate within a specific frequency range suitable for detecting the atomic structures and characteristics of the target materials. The frequency range may be determined by the system's requirements and the properties of the materials being detected. In some embodiments, the gain of the transmitter antenna 120 may be a measure of its ability to direct the RF energy towards the target. Higher gain antennas focus the energy more effectively, resulting in stronger signal transmission over longer distances. The transmitter antenna 120 gain may be optimized for the operational frequency range. In some embodiments, the radiation pattern of the transmitter antenna 120 describes the distribution of radiated energy in space. For effective material detection, the transmitter antenna 120 may have a directional radiation pattern, concentrating the RF energy in a specific direction to enhance detection accuracy. In some embodiments, impedance matching between the transmitter antenna 120 and the transmitter unit 106 may maximize power transfer and minimize signal reflection. Proper impedance matching may ensure efficient operation and reduce losses in the transmission path. In some embodiments, the physical design of the transmitter antenna 120 may include configurations such as dipole, patch, or horn antennas, depending on factors such as frequency range, gain, and environmental conditions. In some embodiments, the transmitter antenna 120 may be integrated with the transmitter unit 106 and other system components through connectors and mounting structures to ensure stable and reliable operation, with considerations for minimizing interference and signal loss.

Further, embodiments may include a battery 122, which may be a type of energy storage device that provides a stable and portable power source for the transmitter unit 106. The battery 122 within the transmitter unit 106 may be utilized to supply electrical energy to the various components involved in generating and transmitting the RF signal. The battery 122 may be designed to store electrical energy and supply it to the respective components as required. The battery 122 may be rechargeable or replaceable cells capable of providing DC voltage. They are selected based on factors such as voltage output and capacity, which may be measured in ampere-hours, Ah, and size to meet the power requirements of each component effectively. In the transmitter unit 106, battery 122 may serve as a portable power source, enabling the generation and transmission of RF signals without requiring a direct connection to an external power supply. The battery 122 powers components such as the oscillator circuit 108, SCR 114, and transformer 116, ensuring continuous operation in various environmental conditions. In some embodiments, the battery 122 used may include lithium-ion, nickel-metal hydride, or other types suitable for portable electronic devices.

Further, embodiments may include a receiver unit 124, which may include the electronic circuit 128. Voltage from the receiver antenna 126 passes through a 10 K gain pot to an NPN transistor 130 used as a common emitter. The output is capacitively coupled to a PNP Darlington transistor 132. A plurality of resistors and capacitors fills in the circuit 128. The output is fed through a RPN 134 to a 555 timer that is used as a voltage-controlled oscillator. A received signal of a given amplitude generates an audible tone at a given frequency. In some embodiments, the output is fed to a tone generator, such as a speaker, via a standard 386 audio amp. Sounds can be categorized as "grunts," "whines," and a particular form of whine with a higher harmonic notably present. In some embodiments, another indicator of a received signal is used, such as light, vibration, digital display, or analog display, in alternative to or in combination with the sound signal. A battery may be used to power the receiver circuit 128. The receiver circuit 128 may utilize a coherent, direct-conversion mixer, homodyne, with RF gain, yielding a baseband signal centered about DC. After a baseband gain stage, the baseband signal is fed to another timing circuit that functions as a voltage-controlled audio-frequency oscillator. The output of this oscillator is amplified and fed to a speaker. In some embodiments, one or more portions of the receiver unit 124 may be implemented in an analog circuit configuration, a digital circuit configuration, or some combination thereof. In one example, the analog configuration may include one or more analog circuit components, such as, but not limited to, operational amplifiers, op-amps, resistors, inductors, and capacitors. In another example, the digital configuration may include one or more digital circuit components, such as, but not limited to, microprocessors, logic gates, and transistor-based switches. In some instances, a given logic gate may include one or more electronically controlled switches, such as transistors, and the output of a first logic gate may control one or more logic gates disposed "downstream" from the first logic gate.

Further, embodiments may include a receiver antenna 126, which may be a device that captures the radio frequency, RF, signals responded from a target material. The receiver antenna 126 may be designed to efficiently receive the responded RF signals and transmit them to the receiver unit 124 for further processing and analysis. The receiver antenna 126 may be responsible for capturing the RF signals that have interacted with the target material. In some embodiments, the receiver antenna 126 may be designed to operate within the same frequency range as the transmitter antenna 120 to ensure compatibility and optimal performance for detecting the atomic structures and characteristics of the target materials. In some embodiments, the sensitivity may be a measurement of the receiver antenna's 126 ability to detect weak signals. A highly sensitive receiver antenna 126 may detect low-power responded signals, enhancing the system's detection capabilities. In some embodiments, the noise figure of the receiver antenna 126 may indicate the level of noise it introduces into the received signal. A lower noise figure may be desirable as it ensures that the captured signals are as clean and strong as possible for accurate processing. In some embodiments, proper impedance matching between the receiver antenna 126 and the receiver unit 124 may maximize the power transfer from the antenna to the processing unit to ensure efficient and accurate signal reception. In some embodiments, the directional properties of the receiver antenna 126 may determine its ability to capture signals from specific directions to distinguish signals responded from the target material versus other sources of interference. In some embodiments, the gain of the receiver antenna 126 may enhance its ability to receive signals from distant targets. Higher gain antennas can improve the system's ability to detect materials at greater distances. In some embodiments, the physical design of the receiver antenna 126 may include various configurations such as dipole, patch, or parabolic antennas and may be based on factors such as frequency range, gain, and the specific detection requirements. In some embodiments, the receiver antenna 126 may be integrated with the receiver unit 124 and other system components through connectors and mounting structures to ensure stable and reliable operation, with considerations for minimizing interference and signal loss. In some embodiments, the receiver antenna 126 and the transmitter antenna 120 may be a single antenna used by the RF detection device 102.

Further, embodiments may include a circuit 128 within the receiver unit 124, which may be an assembly of electrical components designed to process the received RF signal. The circuit 128 may accurately interpret the RF signals responded or emitted from the target materials and convert them into data that can be analyzed by the RF detection device 102. The circuit 128 in the receiver unit 124 may be employed to handle signal amplification, filtering, demodulation, and signal processing. When an RF signal is received via the receiver antenna 126, it is typically weak and may contain noise or interference. The first stage of the circuit 128 may involve an amplifier that boosts the signal strength to a level suitable for further processing. This amplification ensures that even weak signals can be analyzed effectively. Next, the circuit 128 may include filtering components that serve to remove unwanted frequencies and noise from the received signal. Filters ensure that only the relevant frequency components of the RF signal are passed through, enhancing the signal-to-noise ratio and improving the clarity of the data. The circuit 128 may also incorporate a demodulator, which extracts the original information-bearing signal from the modulated RF carrier wave. This step interprets the data encoded in the RF signal, allowing the system to identify specific characteristics or signatures of the target materials. In some embodiments, the circuit 128 may include various signal processing components, such as analog-to-digital converters ADCs, which convert the analog RF signal into digital data. This digital data may then be processed by the control panel 146 or other computational units within the system for detailed analysis. The signal processing may involve algorithms to detect specific patterns, frequencies, or anomalies that indicate the presence of target materials. The components within the circuit 128 interact seamlessly to ensure accurate and efficient signal processing. For example, the amplified signal from the amplifier is passed to the filter, which cleans up the signal before it reaches the demodulator. The demodulated signal is then digitized by the ADC and sent to the control panel 146 for analysis.

Further, embodiments may include an NPN transistor 130, which may be a three-terminal semiconductor device used for amplification and switching of electrical signals. The NPN transistor 130 may consist of three layers of semiconductor material: a thin middle layer, or base, between two heavily doped layers, or emitter and collector. The NPN transistor operates by controlling the flow of current from the collector to the emitter, regulated by the voltage applied to the base terminal. The NPN transistor 130 integrated into the receiver unit 124 may be designed to process incoming RF signals and may operate in a configuration where the base-emitter junction is forward-biased by a small control voltage provided by the preceding stages of the circuit. The collector of the NPN transistor 130 may be connected to the circuit's supply voltage through a load resistor. When a small current flows into the base terminal, it allows a larger current to flow from the collector to the emitter. This amplification process increases the strength of the received signal, enabling subsequent stages of the circuit to process it more effectively. In the receiver unit 124, the NPN transistor 130 may be employed within amplifier stages where signal gain is beneficial. By controlling the base current, the circuit can modulate the transistor's conductivity and thereby regulate the amplification factor. This capability enhances weak RF signals received by the receiver antenna 126 and prepares them for further processing. In some embodiments, the NPN transistor 130 may be utilized in conjunction with capacitors and resistors to form amplifier circuits tailored to the specific requirements of the RF detection device 102. Capacitors may be used to couple AC signals while blocking DC components, ensuring that only the RF signal is amplified. Resistors set the biasing and operating points of the transistor, optimizing its performance within the circuit.

Further, embodiments may include a PNP Darlington transistor 132, which may be a semiconductor device consisting of two PNP transistors connected in a configuration that provides high current gain. The PNP Darlington transistor 132 integrates two stages of amplification in a single package, where the output of the first transistor acts as the input to the second, significantly boosting the overall gain of the circuit. The PNP Darlington transistor 132 amplifies weak RF signals received by the receiver antenna 126. The incoming RF signal is fed into the base of the first PNP transistor within the Darlington pair. The PNP Darlington transistor 132, due to its high current gain, allows a much larger current to flow from its collector to the emitter compared to the base current. The output from the collector of the first transistor serves as the input to the base of the second PNP transistor in the Darlington pair. The second PNP transistor further amplifies the signal received from the first stage, again with significant current gain.

Further, embodiments may include an RPN 134 or resistor potentiometer network, which may be an electrical circuit composed of resistors and potentiometers interconnected in a specific configuration to achieve desired electrical characteristics, such as voltage division, signal attenuation, or adjustment of resistance values. Potentiometers, also known as variable resistors, allow for manual adjustment of resistance within the circuit, while resistors set fixed values to control current flow and voltage levels. The RPN 134 in the receiver unit 124 may be configured to adjust signal levels received from the receiver antenna 126 and prepare them for further processing. This network consists of resistors and potentiometers connected to achieve precise voltage division and attenuation. By adjusting the potentiometers, operators can fine-tune the signal strength and impedance matching, optimizing signal quality for subsequent stages of signal processing. The RPN 134 ensures that incoming RF signals from the receiver antenna 126 are properly attenuated and scaled to match the input requirements of downstream electronics. This calibration process maintains signal integrity and fidelity throughout the reception and decoding process. In some embodiments, the potentiometers within the RPN 134 may allow for manual adjustment of signal parameters such as amplitude and impedance, enabling operators to optimize signal reception based on environmental conditions and operational requirements.

Further, embodiments may include a tone generator 136, which may be a type of electronic device that produces audio signals or tones to alert the user of specific conditions. The tone generator 136 within the receiver unit 124 is utilized to generate audible alerts when the detection system identifies the presence of target materials. The tone generator 136 in the receiver unit 124 may be employed to create specific tones that serve as audible indicators for the user. By generating these tones, the tone generator 136 provides immediate feedback to the operator, signaling the detection of target materials in real time. The tone generator 136 may ensure that the operator is promptly informed of detections without needing to constantly monitor visual displays. The tone generator 136 produces distinct sounds that correspond to different detection events, making it easier for the operator to understand the system's status and respond accordingly. The tone generator 136 may act as a critical alerting component within the receiver unit 124. When the control panel 146 determines that the RF signal corresponds to a detected target material, it sends a signal to the tone generator 136. This triggers the tone generator 136 to produce a sound, alerting the operator to the detection event.

Further, embodiments may include an audio amplifier 138, which may be a type of electronic device designed to increase the amplitude of audio signals. The audio amplifier 138 within the receiver unit 124 may be utilized to boost the audio signals generated by the tone generator 136, ensuring that the output sound is sufficiently loud and clear for the operator to hear. The audio amplifier 138 in the receiver unit 124 may be employed to enhance the volume and clarity of the audio tones produced by the tone generator 136. By amplifying these audio signals, the audio amplifier 138 ensures that the operator receives audible alerts even in noisy environments, thus improving the overall effectiveness of the detection system. The audio amplifier 138 may act as an intermediary component between the tone generator 136 and the output device, such as a speaker. When the tone generator 136 produces an audio signal, this signal is sent to the audio amplifier 138. The amplifier then boosts the signal's power, making it strong enough to drive the speaker and produce an audible sound. The audio amplifier 138 is connected to other components within the receiver unit 124, including the tone generator 136 and the speaker. It receives the low-power audio signals from the tone generator 136 and amplifies them to a level suitable for driving the speaker.

Further, embodiments may include a battery 140, which may be a type of energy storage device that provides a stable and portable power source for the receiver unit 124. The battery 140 within the receiver unit 124 may be utilized to supply electrical energy to the various components involved in generating and transmitting the RF signal. The battery 140 may be designed to store electrical energy and supply it to the respective components as required. The battery 140 may be rechargeable or replaceable cells capable of providing DC voltage. They are selected based on factors such as voltage output and capacity, which may be measured in ampere-hours, Ah, and size to meet the power requirements of each component effectively. In the receiver unit 124, batteries provide electrical energy to receive and process RF signals detected by the receiver antenna 126. The battery 140 may power components such as amplifiers, filters, and signal processing circuitry, enabling the device to analyze incoming RF signals and extract relevant information. In some embodiments, the battery 140 used may include lithium-ion, nickel-metal hydride, or other types suitable for portable electronic devices.

Further, embodiments may include a directional shield 142, which may be a physical barrier or enclosure designed to direct or block electromagnetic radiation in a specific direction. The directional shield 142 may be constructed from conductive materials such as metal to attenuate or reflect RF signals, thereby controlling the propagation of electromagnetic waves. The directional shield 142 may be positioned around the RF oscillator and antenna 120, 126 components and may act as a physical barrier that prevents RF signals from propagating in undesired directions, thereby enhancing the precision and accuracy of signal transmission and reception. During operation, when the transmitter unit 106 generates an RF signal, the directional shield 142 helps to focus and channel this signal towards the intended detection area. By reducing signal dispersion and reflection, the directional shield 142 improves the efficiency of signal transmission and enhances the system's overall sensitivity to detecting RF responses from underground objects or materials.

Further, embodiments may include a power supply 144, such as batteries serving as the power source for specific components within the RF detection device 102, including the control panel 146. These batteries are designed to store electrical energy and supply it to the respective components as required. The batteries in the control panel 146 may be rechargeable or replaceable cells capable of providing DC voltage. They are selected based on factors such as voltage output and capacity, which may be measured in ampere-hours, Ah, and size to meet the power requirements of each component effectively. In some embodiments, the control panel 146 relies on batteries to maintain functionality for user interface operations, data processing, and communication with other parts of the RF detection device 102. The batteries in the control panel 146 ensure that they remain operational during field use, supporting tasks such as signal monitoring, parameter adjustment, and data transmission. In some embodiments, the batteries used in these components may include lithium-ion, nickel-metal hydride, or other types suitable for portable electronic devices. They are integrated into the design to provide sufficient power capacity and longevity, allowing the RF detection device 102 to operate autonomously for extended periods between recharges or battery replacements.

Further, embodiments may include a control panel 146, which may be a centralized interface comprising electronic controls and displays. The control panel 146 may serve as the user-accessible interface for configuring, monitoring, and managing the RF detection device's 102 operational parameters and data output. In some embodiments, the control panel 146 may be designed to provide operators with intuitive access to control and monitor various aspects of the RF detection device 102. The control panel 146 may allow for the configuration of settings such as signal frequency, transmission power, receiver sensitivity, and signal processing algorithms. In some embodiments, operators may use the control panel 146 to initiate and terminate detection operations, adjust calibration settings, and troubleshoot operational issues. In some embodiments, the control panel 146 may include a graphical display screen or LED indicators to present real-time status information and measurement results. In some embodiments, input controls such as buttons, knobs, or touch-sensitive panels may enable operators to interact with the device, input commands, and navigate through menu options. The control panel 146 may interface directly with the internal electronics of the RF detection device 102, including the transmitter unit 106, receiver unit 124, antennas 120, 126, and signal processing circuitry. Through electronic connections and communication protocols, the control panel 146 may send commands to adjust operational parameters and receive feedback and status updates from the device. In some embodiments, the control panel 146 may be mounted on the support frame 104 and may provide an operator with control of the RF detection device 102, including adjusting various settings and signaling the operator of a detected material. In some embodiments, a rechargeable battery may power the RF detection device 102, including the transmitter unit 106, the receiver unit 124, and the control panel 146. In some embodiments, multiple batteries may be used. In some embodiments, a tone generator, such as a speaker, may be mounted to the support frame 104 to provide audible signals to the operator for detecting target materials.

Further, embodiments may include a memory 148, which may include suitable logic, circuitry, and/or interfaces that may be configured to store a machine code and/or a computer program with at least one code section executable by a processor. Examples of implementation of the memory 148 may include, but are not limited to, Random Access Memory (RAM), Read Only Memory (ROM), Hard Disk Drive (HDD), and/or a Secure Digital (SD) card.

Further, embodiments may include a base module 150, which may sweep through a list of frequencies in order to find which frequencies generate a response in a sample material. For each frequency, the base module 150 may initiate the detection module 152 to determine if the frequency elicits a response from the material based on its resonant characteristics. The base module 150 may then generate a table of which frequencies elicited a response in the sample material. The base module 150 may then initiate the determination module 154 to compare the table to a material database 158 (shown in FIG. 6) in order to identify which material or materials are present in the sample. If more than one possible identification is returned, the base module 150 may narrow down the options using conditional logic and/or data from additional sensors.

Further, embodiments may include a detection module 152, which may be responsible for configuring and generating the RF signal through the transmitter unit 106. The detection module 152 may interact with the control panel 146 to set parameters such as frequency and amplitude. Once the RF signal is generated and transmitted via the transmitter antenna 120, the detection module 152 may monitor the receiver unit 124 for RF signal reception. Upon receiving the RF signal via the receiver antenna 126, the detection module 152 processes the signal to extract relevant data about the presence of target materials. This processed data is then sent to the base module 150 for further analysis and decision-making. The detection module 152 operates iteratively as long as the system remains activated, continuously polling and analyzing data to detect and identify target materials based on the received RF signals.

Further, embodiments may include a determination module 154, which may identify the material or materials present in a sample. The determination module 154 may receive a table of frequencies and responses from the base module 150, which correspond to the frequencies at which resonance with a material was detected. The determination module 154 may then compare that table to the material database 158 to identify materials present in the sample.

Further, embodiments may include a reporting module 156, which may report material data to the application-specific apparatus 162 via the integration connection apparatus 160.

Further, embodiments may include a material database 158, which may contain a list of materials and their associated resonance frequencies. These resonance frequencies are the frequencies of electromagnetic waves emitted from the transmitter antenna 120 that produce a response from the material that can be received by the receiver unit 124.

Further, embodiments may include an integration connection apparatus 160, which may connect the RF detection device 102 to the application-specific apparatus 162. The integration connection apparatus 160 may allow data to be shared between the RF detection device 102 and the application-specific apparatus 162. This connection may be wired or wireless. If wired, the connection may use a Coaxial cable, Fiber Optic cable, Twisted Pair cable, or other data cables known in the art. If wireless, the connection may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The integration connection apparatus 160 may be application specific. For example, integration with a cargo crane for maritime operations involves detecting hazardous and illegal materials in cargo containers by using a robust wired or wireless connection for real-time data transmission, mounting the device on the crane's boom or hook, scanning cargo containers for hazardous materials before loading or unloading, sending real-time alerts to the crane operator's control panel, and automatically halting the crane's operation or preventing the loading/unloading of suspicious containers. Integration with a loading dock for mail rooms involves detecting explosives and hazardous materials in incoming packages by using a high-speed wired connection for seamless data integration, integrating the device into the scanning system at the loading dock, scanning packages for dangerous materials, providing alerts and visual indicators to personnel, and preventing the unloading of hazardous packages. Integration with airport baggage handling systems involves detecting weapons and chemical threats in baggage by using a wireless connection for flexibility, mounting the device within the baggage handling system, scanning baggage for threats, providing immediate alerts and visual indicators to security operators, and automatically diverting suspicious baggage for further inspection. Integration with autonomous vehicles for environmental monitoring involves detecting chemical spills or hazardous substances in industrial areas by utilizing a wireless connection for real-time data streaming, integrating the device onto the vehicle's chassis or payload area, scanning the environment for hazardous substances, sending real-time data to a central monitoring system, and enabling rapid response teams to manage environmental hazards. Integration with medical equipment for enhanced diagnostics involves early detection of cancer in MRI or CT scanners by using a high-speed wired connection for seamless data integration, integrating the device into the scanner's hardware setup, scanning for molecular signatures indicative of cancerous tissues, overlaying data onto MRI or CT images, and enhancing the radiologist's ability to detect and diagnose cancer by providing additional molecular resonance data. Integrating the RF detection device 102 with these application-specific apparatuses may significantly enhance safety, security, and efficiency across various industries, ensuring thorough checks and accurate identification of hazardous materials and improving overall operational effectiveness.

Further, embodiments may include an application-specific apparatus 162, which may be an apparatus designed for a specific application such as a cargo crane, loading dock, or handling system. The application-specific apparatus 162 may function separately from the RF detection device 102 but may use the data from the RF detection device 102 to augment its functions. For example, a cargo crane may use the RF detection device 102 to detect the contents of cargo containers in order to check for hazardous and/or illegal materials before the containers are loaded or unloaded from a ship. For another example, a loading dock for a mail room may use the RF detection device 102 to check for explosives and/or hazardous materials before cargo is unloaded by humans. For another example, a handling system such as one for mail or airport baggage may use RF detection to detect weapons such as guns or explosives and chemical weapons like anthrax. The integration of RF detection technology enables these systems to perform thorough security checks, mitigating risks associated with handling and transporting potentially dangerous items. By integrating the application-specific apparatus 162 with the RF detection device 102, the system can achieve a higher level of operational safety and security.

Further, embodiments may include a user interface 164, which may either accept inputs from users or provide outputs to the users or may perform both actions. In one case, a user can interact with the user interface 164 using one or more user-interactive objects and devices. The user-interactive objects and devices may include user input buttons, switches, knobs, levers, keys, trackballs, touchpads, cameras, microphones, motion sensors, heat sensors, inertial sensors, touch sensors, or a combination of the above.

Further, the user interface 164 may either be implemented as a Command Line Interface (CLI), a Graphical User Interface (GUI), a voice interface, or a web-based user interface. The user interface 164 may display data on detected materials.

Further, embodiments may include an integration communication apparatus 166, which may perform some physical function of the application-specific apparatus. For example, for a cargo crane, the integration communication apparatus 166 may be an alarm which may be activated when a hazardous material is detected in a cargo container. For another example, for a loading dock, the integration communication apparatus 166 may be the gate opening mechanism (e.g., automated gate), which may close the gate and prevent it from opening when explosives are detected in a delivery truck. Alternatively, the gate opening mechanism may be configured to open the gate of a hazardous material is not detected. For another example, for a handling system, the integration communication apparatus 166 may be a mechanical arm that redirects the problem package or luggage into a quarantine zone when chemical weapons are detected. Other functional options for the integration communication apparatus 166 could include real-time data communication with centralized control systems, allowing for immediate updates and coordinated responses across multiple operational areas. For example, in a large-scale logistics operation, the detection of a hazardous material by one apparatus could trigger alerts and safety protocols in adjacent systems, creating a networked safety response. Additionally, the apparatus might be equipped with self-diagnostic features, continuously monitoring its own operational status and performing regular checks to ensure optimal performance and reliability. This self-monitoring capability would be beneficial in high-stakes environments where the failure of safety mechanisms could have significant consequences. The integration communication apparatus 166 may serve as a critical interface between the detection capabilities of the RF detection device 102 and the physical operational responses of the application-specific apparatus 162. The integration communication apparatus 166 may ensure that detected threats are promptly and effectively addressed through automated physical actions.

Further, embodiments may include an apparatus module 168, which may receive data from the RF detection device 102 and use that data to actuate the integration communication apparatus 166, display the data on the user interface 164, and initiate the detection process of the RF detection device 102. In another embodiment, a material detection system uses a hybrid antenna that can operate both in RF-based and magnetic-based detection modes. This system is capable of switching between detecting materials based on their interaction with the RF field or the magnetic field, depending on the material being analyzed. In RF mode, the antenna transmits RF waves, and the system analyzes how the material reflects or absorbs these waves, providing information based on the dielectric constant or conductive properties of the material. In magnetic mode, the antenna focuses on the interaction between the material and the magnetic field component of the electromagnetic wave, allowing detection of materials with high magnetic permeability or strong magnetic responses. For example, the system could be used to detect metallic substances or magnetic compounds, such as those found in explosive materials, by optimizing the detection process based on which field interaction yields the clearest signature.

In yet another embodiment, a near-field material detection system uses a magnetic-based loop antenna that focuses on magnetic field interaction within close proximity to the target material. This system uses magnetic resonance principles, detecting changes in the magnetic field due to interactions with materials possessing magnetic susceptibility, such as ferromagnetic metals. The loop antenna generates a localized oscillating magnetic field, and when materials are introduced into the detection zone, they alter the field by inducing eddy currents or magnetic resonance effects. These changes are then measured to determine the material's properties. This method is particularly useful in applications such as industrial quality control or close-range security screening, where detecting the magnetic characteristics of a material offers clear advantages.

In still another embodiment, far-field magnetic resonance techniques are employed for material detection at greater distances. This system operates by transmitting an electromagnetic wave where the magnetic field component is emphasized, focusing on its interaction with materials that have resonant magnetic properties. By tuning the system to specific resonant frequencies, materials that exhibit strong magnetic responses, such as certain alloys or ferromagnetic materials, can be detected over a larger range. The detection system then analyzes the phase or amplitude of the reflected wave to infer material characteristics. This embodiment is particularly suitable for remote sensing applications, such as geological surveys, where materials can be identified based on their magnetic resonance even when located at a distance from the detection apparatus.

In other embodiments, an array of antennas is used to simultaneously detect materials based on both RF and magnetic field interactions. The antenna array consists of dipole antennas optimized for detecting the electric component of the RF wave and loop antennas that focus on the magnetic field interaction. These two types of signals are combined to create a composite material signature, allowing for detailed analysis of both the dielectric and magnetic properties of the material. By processing both electric and magnetic field data, the system can more accurately identify materials that exhibit a combination of electrical conductivity and magnetic permeability, such as advanced composites or stealth materials. This dual-mode system can be particularly useful in defense or aerospace applications.

In still other embodiments, a magnetic-based antenna system is designed for material detection in environments where RF signals would typically be degraded, such as underground or underwater. This system uses a loop antenna to generate a magnetic field that interacts with materials possessing strong magnetic properties, even in situations where RF signals are heavily attenuated. The antenna detects variations in the magnetic field caused by materials with high permeability, such as iron or nickel-based substances. This method allows for the detection of magnetic materials in conditions where RF detection would be unreliable, such as in deep-sea exploration or subterranean mining operations, where conventional RF signals would fail to penetrate effectively.

In further embodiments, a phased array system is designed specifically to manipulate the magnetic component of the electromagnetic wave for high-resolution material detection. A phased array of loop antennas is used to steer and focus the magnetic field, creating a directed magnetic beam that can scan across a target area. The system detects materials based on how they alter the magnetic field, allowing for precise location and identification of magnetic objects. By adjusting the phase and amplitude of each antenna element, the system provides a fine degree of control, enabling highly localized material detection. This approach is useful in situations requiring detailed spatial resolution, such as identifying hidden metallic objects in security screening or detailed inspections in industrial settings.

In additional embodiments, a portable or wearable material detection system is implemented using a small, magnetic-based loop antenna for detecting magnetic materials in close proximity. This compact system allows security personnel or industrial workers to move through different environments while continuously monitoring for materials that exhibit magnetic properties. The loop antenna generates a localized magnetic field and detects perturbations caused by nearby magnetic materials, such as concealed weapons or magnetic tags. The system then alerts the user when such materials are detected, making it ideal for field operations where mobility and ease of use are critical.

In yet another embodiment, the material detection system is entirely RF-based, using a highly optimized RF antenna to detect materials based solely on their interaction with the RF field. The RF antenna transmits electromagnetic waves at specific frequencies, and the system analyzes how these waves are reflected, absorbed, or scattered by the material. By focusing on the dielectric constant or conductive properties of the target material, the system can accurately identify substances such as explosives, chemicals, or other dielectric materials. This approach is particularly effective in environments where magnetic field-based detection is unnecessary or less effective. The RF-based system can be adapted for wide-ranging applications, from industrial material testing to security scanning, where detecting the electrical characteristics of the material is sufficient for identification.

Figure 2:
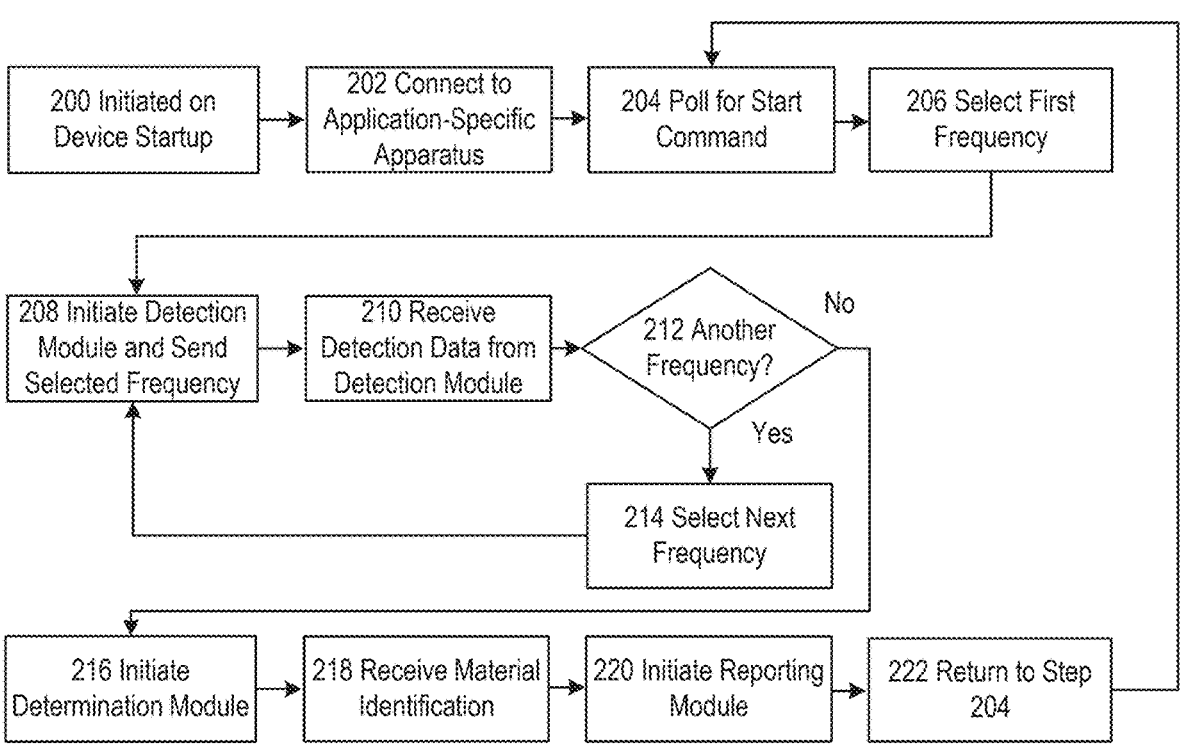
FIG. 2 is a flow chart of a method performed by a Base Module, according to an embodiment.

FIG. 2 is a flow chart of a method performed by the base module 150. The base module 150 may be initiated at step 200 when the RF detection device 102 starts up. The base module 150 may also be initiated when a sample is detected or when a user presses a button to begin sample identification. The base module 150 may connect at step 202 to the application-specific apparatus 162 via the integration connection apparatus 160. The base module 150 may poll at step 204 for a command to start the detection process from the application-specific apparatus 162. The base module 150 may select at step 206 a first frequency to transmit. This may be selected from a range of frequencies, such as 10-1000 Hz. The range of frequencies may correspond to the range in which the resonant frequencies of the most common materials are found. The frequencies may be selected in any order, but optimally, the frequencies most likely to resonate with materials of interest may be selected first. For example, if Hydrochloric Acid (HCl) is a material of interest, then its resonant frequency, which may be 180 Hz, may be selected first. The base module 150 may refer to the material database 158 in order to determine which order to select the frequencies in. Each entry in the material database 158 may have a priority tier associated with a frequency and with an application of the RF detection device 102. For example, for a medical application, materials that indicate cancer, such as Prostate-Specific Antigen and Cancer Antigen 125, may be 1st priority, with unlikely but still dangerous materials such as Uranium being a lower priority. For another example, in a security application, hazardous materials such as Uranium and Nitroglycerin may be 1st priority, whereas while H2O2 can be used to create explosives, it also has legitimate uses as an antiseptic and so is a lower priority. The base module 150 may skip over selecting frequencies for which there is no known material that resonates with that frequency. The base module 150 may initiate at step 208, the detection module 152. The base module 150 may then send the selected frequency to the detection module 152. The detection module 152 may generate an RF signal at the selected frequency through the transmitter unit 106. The detection module 152 may interact with the control panel 146 to set parameters such as frequency and amplitude. Once the RF signal is generated and transmitted via the transmitter antenna 120, the detection module 152 may monitor the receiver unit 124 for RF signal reception. Upon receiving the RF signal via the receiver antenna 126, the detection module 152 processes the signal to extract relevant data about the presence of target materials. This processed data is then sent to the base module 150 for further analysis and decision-making. The base module 150 may receive at step 210 detection data from the detection module 152. Detection data may be a simple binary indication if the transmission frequency produced a resonance response from the sample. For example, the data may indicate there was a resonance response at 180 Hz but no resonance response at 181 Hz. In some embodiments, detection data may include the detected response signal. If the data from the detection module 152 is complex, then the base module 150 may also undertake data processing steps such as cleaning, formatting, reduction, and analysis. The base module 150 may determine at step 212 if another frequency has not yet been selected. In some cases, in step 212 a specific group of frequencies could be selected, for instance in a crane application, it may be required to choose frequencies that detect are from a list of hazardous materials. In some cases, in step 212 a specific group of frequencies could be selected, for instance in a loading dock application, where the materials are a group from a list of materials that have illegal materials to ship, e.g. lithium or hazardous shipping materials. In some embodiments, certain frequencies may be selected multiple times to improve the confidence level of the detection data for those frequencies. The base module 150 may include a smart frequency selection algorithm, which may select the next frequency based on an optimized selection pattern. For example, if a material was detected at a certain frequency, the selection algorithm may cause the base module 150 to select the next frequency where that same material would be detected to quickly confirm the presence of the material. Likewise, if a material was not detected at its expected frequency, other resonant frequencies for that material may not be selected at all. If another frequency has not yet been selected, the base module 150 may select at step 214, the next frequency, and return to step 208. If each frequency in the frequency range has been selected, the base module 150 may initiate at step 216 the determination module 154 and send in the detection data for each selected frequency. This may be a list of which selected frequencies produced any response at all or a data table of selected frequencies and their associated received resonance response or lack thereof. The determination module 154 may compare the received detection data to the material database 158 to identify materials present in the sample. The base module 150 may receive at step 218 material identification or identifications from the determination module 154. For example, the determination module 154 may identify anthrax in the sample. The base module 150 may initiate the reporting module 156 and send the material identification or identifications. The reporting module may send the material identification or identifications to the apparatus module 168 of the application-specific apparatus 162. The base module 150 may return to step 204 to poll for another command to start detection.

In one configuration, the system further includes a machine learning system 170 configured to recognize patterns between the material and the resonance characteristics that indicate the presence of the material.

Figure 3:
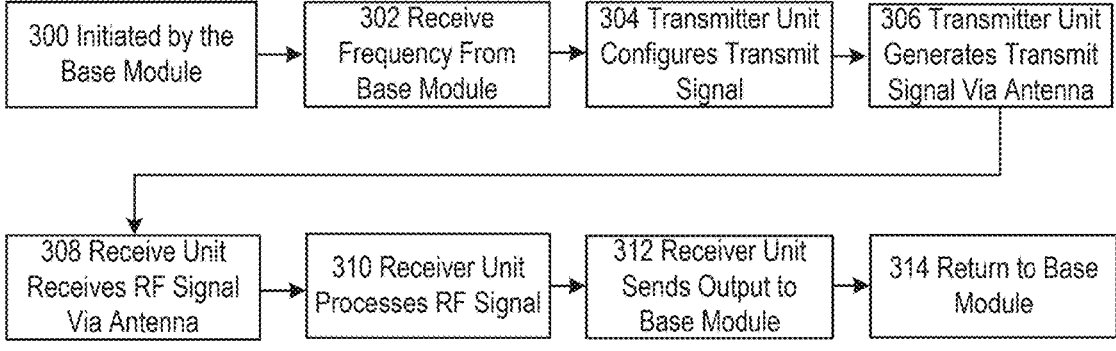
FIG. 3 is a flow chart of a method performed by a Detection Module, according to an embodiment.

FIG. 3 is a flow chart of a method performed by the detection module 152. The detection module 152 may be initiated at step 300 by the base module 150. In some embodiments, the detection module 152 may be initiated by the user or operator through the control panel 146. The detection module 152 receives at step 302 the selected frequency from the base module 150 154. The detection module 152 may command at step 304 the transmitter unit 106 to configure the transmit signal. The transmitter unit 106 prepares the signal that will be transmitted at the selected frequency. In some embodiments, the parameters and components may be set up with the desired characteristics to generate the RF signal. The control panel 146 determines the specific parameters of the RF signal that need to be generated. Once the parameters are set, the control panel 146 sends a command to activate the oscillator circuit within the transmitter unit 106. The oscillator circuit may be responsible for generating a stable RF signal at the desired frequency and may consist of components like capacitors, inductors, and amplifiers that work together to create the oscillating signal. The power delivery to the oscillator circuit may be managed by the SCR 114. When the control panel 146 sends a gate signal to the SCR 114, it switches from a non-conductive to a conductive state, allowing current from the power source, such as batteries, to flow to the oscillator circuit. After the oscillator circuit generates the RF signal, the transformer 116 adjusts the voltage level of the signal to match the requirements of the transmit antenna 120. It may also provide impedance matching to ensure efficient signal transmission. The transformer 116 ensures that the RF signal is at the appropriate voltage and current levels for optimal transmission. For example, the control panel 146 may determine that an RF signal with a frequency of 50 Hz requires a specific power level. It sends a command to the transmitter unit 106 to configure this signal. The oscillator circuit is activated, generating an RF signal at 50 Hz. The SCR 114 is triggered, allowing power from the batteries to flow to the oscillator circuit. The generated signal is then conditioned by the transformer 116, ensuring it is at the correct voltage level for transmission. The detection module 152 may command at step 306 the transmitter unit 106 to generate the transmit signal via the transmit antenna 120. The transmitter unit 106 generates the RF signal and transmits it through the transmit antenna 126 by converting electrical energy into radio waves that can be used for detecting specific materials. The transmit antenna 120 radiates the RF signal into the environment. The radio waves propagate through the medium, such as air or ground, and interact with the target materials. The interaction between the RF signal and the target materials will produce detectable changes in the signal, which can be received and analyzed by the receiver unit 124. For example, the transmitter unit 106 generates a wave pulse at a specified frequency that is transmitted directionally into the ground. The generated frequency is closely approximate or exact to that of the target material, and that relationship creates a responsive RF wave and/or a magnetic line between the transmitter antenna 120 and the target. When the RF detection device 102 is aligned with a target material, for example, when the opening of the directional shield 142 is pointing toward the target material, the voltage produced by the receiver antenna 126 changes and thereby produces a detection output signal, such as an audio signal having a tone different than that of the baseline. A response wave is produced by the target material that amplifies, resonates, offsets, or otherwise modifies the magnetic field passing through the receiver antenna 126 to alter the voltage produced, thereby generating the output signal. The receiver antenna 126 is responding to a voltage increase from the transmitter antenna 120 swinging over the magnetic line to the material. The detection module 152 may command at step 308 the receiver unit 124 to receive RF signal via receiver antenna 126. The receiver unit 124 captures the RF signal that has interacted with the environment and potential target materials using the receiver antenna 126. The receiver antenna 126 captures the incoming RF signal, which has been transmitted by the transmitter unit 106 and has interacted with the environment and any target materials present. The receiver antenna 126 may be designed to effectively capture these radio waves and convert them back into electrical signals. Once the RF signal is received by the receiver antenna 126, it may be fed into an RF amplifier, which boosts the signal strength without significantly altering its characteristics. In some embodiments, the use of the standard atomic structure of a material may be used to calculate the resonant frequency to which a particular material would generate or respond. Each element and material comprise a definable atomic structure composed of the total number of protons and neutrons of that target material. This unique nuclear composition of every material makes it uniquely identifiable and detectable in many cases. The manner in which this information is applied thus enables the detection of any target material. A target material can be detected and located based on a resonant, responsive RF wave and/or magnetic relationship between the target and a transmitter antenna 120 transmitting at the frequency specific and unique to the target material. The transmitter unit 106, through the transmitter antenna 120, induces a resonance due to responsive RF waves and/or magnetic and/or otherwise in a targeted material to resonate at a specific computed frequency. The receiver antenna 126 and receiver circuit 128 detect the resonance induced in the material and, in so doing, indicate the approximate line of bearing to the material. The primary method used by this detection system to detect specific materials is based on tuning the circuit 108 of the transmitter unit 106 to a specific value that is computed for the material of interest. The frequency can be based on any of the three defining characteristics of the material, the number of protons, the number of neutrons, or the atomic mass, such as the sum of protons and neutrons and combinations thereof. The frequency can be transmitted at varying voltages to compensate for other external effects or interference. In some embodiments, a table or database of characteristics of common materials may be used to calculate the resonant frequencies. To accomplish this tuning, the frequency of the signal from the transmitter antenna 120 is set to some harmonic of the elements of the material. The detection module 152 may command at step 310 the receiver unit 124 to process the RF signal. The receiver unit 124 processes the received RF signal to extract meaningful data that can be analyzed for the presence of specific materials, which may involve further amplification, filtering, digitization, and initial data processing before the signal is sent to the control panel 146 for detailed analysis. In some embodiments, after the RF signal is received and initially amplified, it may require further amplification to ensure the signal is at an optimal level for processing. In some embodiments, an additional RF amplifier within the receiver unit 124 may boost the signal strength while maintaining its integrity. The amplified signal may be subjected to more advanced filtering by the filter circuit, which removes any residual noise and unwanted frequencies that might have passed through the initial filtering stage. In some embodiments, the filtering may involve bandpass filters that allow only the desired frequency range to pass through. The filtered analog signal may be converted into a digital format using an Analog-to-Digital Converter, ADC. The ADC samples the analog signal at a high rate and converts it into a series of digital values. The digitized signal may be processed using digital techniques. The digital signal may be fed into a Digital Signal Processor, DSP, within the receiver unit 124. In some embodiments, the DSP may perform initial data processing tasks such as demodulation, noise reduction, and feature extraction. Demodulation involves extracting the original information-bearing signal from the carrier wave. Noise reduction techniques may further clean the signal, making it easier to analyze. Feature extraction may involve identifying characteristics of the signal that are indicative of the presence of target materials. The detection module 152 may command at step 312 the receiver unit 124 to send the output to the base module 150. The resultant data from the process is organized and packaged, which may involve structuring the data into packets, adding metadata such as timestamps and identifiers, and incorporating error-checking codes to ensure data integrity during transmission. The data may be a binary indication of whether or not a resonance response was detected by the receive antenna 126. Alternatively, some or all of the received signal data may be sent to the base module 150. The detection module 152 may return at step 414 to the base module 150.

FIG. 4 is a flow chart of a method performed by the determination module 154. The determination module 154 may be initiated at step 400 by the base module 150. The determination module 154 may receive at step 402 detection data from the base module 150. This may be a list of which selected frequencies produced any response at all or a data table of selected frequencies and their associated received resonance response. The determination module 154 may compare at step 404 the detection data to the material database 158. For example, if the detection data showed a response at 180 Hz, 340 Hz, and 1160 Hz, then the determination module 154 would search the material database 158 for any entries with those frequencies. The determination module 154 may identify at step 406 the possible materials in the sample. These would be any materials or elements that have resonant frequencies that correspond to the frequencies in the detection data. For example, given that there was a response at the frequencies at 92 Hz, 180 Hz, 340 Hz, and 1160 Hz, then the possible materials in the sample would be Uranium, $H_2O_2$, HCl, and Nitroglycerin ($CH_2NO_3CHNO_3CH_2NO_3$) based on the data in the material database 158. The determination module 154 may attempt at step 408 to resolve any ambiguous results. Since some materials may share similar features, such as total atomic weight or number of protons, they may have similar or the same resonant frequencies. In ambiguous cases, the determination module 154 may be able to identify which material is present based on the material's other resonance frequencies. For example, $H_2O_2$ and HCl have a resonance frequency of 180 Hz, which does appear in the detection data. However, 340 Hz also had a response, which corresponds to $H_2O_2$ and not HCl which means $H_2O_2$ is likely present. Further, there was no response at 360 Hz which indicates that HCl is not present in the sample. For another example, Uranium would resonate at 92 Hz because it has 92 protons. But Uranium has several isotopes, most notably Uranium-235 and Uranium-238. Detection of a resonant response at 92 Hz and 238 Hz, but no response at 235 Hz would indicate Uranium-238. Some ambiguities cannot be resolved by the determination module 154 and may be sent to the base module 150 as an ambiguous identification for further differentiation. The determination module 154 may send at step 410 all identified materials and/or elements to the base module 150. The determination module 154 may return at step 412 to the base module 150.

The determination module 154 may send at step 410 not only all identified materials, but it may calculate and send various aspects of the identified materials directed to the application-specific apparatus 162.

For a use case such as a Crane for Detecting Dirty Bomb Materials, the determination module 154 may send, at step 410, not only all identified materials but also calculate and send various aspects of the identified materials directed to the application-specific apparatus 162. For example, if the application-specific apparatus is a crane, and the application-specific task is to detect the shipping of dirty bomb materials, the determination module 154 may determine several critical factors. It would detect if a dirty bomb existed in a current container being moved by the crane. This involves identifying the type of material being detected, performing a rough calculation of the amount of dirty bomb material, and assessing the probability of the dirty bomb material posing a threat level that warrants a crane warning. In some cases, the dirty bomb material might be shielded by specialized material, so the application-specific apparatus may detect this shielding material and send resultant data that infers the presence of dirty bomb material.

For the use case of truck loading docks for detecting hazardous materials, the determination module 154 may send, at step 410, not only all identified materials but also calculate and send various aspects of the identified materials directed to the application-specific apparatus 162. For example, if the application-specific apparatus is a truck loading dock, and the application-specific task is to detect hazardous materials being loaded onto trucks, the determination module 154 would perform several critical functions. It would identify the presence of hazardous materials in the cargo being loaded. This involves classifying the type of hazardous material detected, estimating the quantity of the hazardous material, and evaluating the probability that the hazardous material poses a threat warranting an alert at the loading dock. In some instances, hazardous materials might be transported using shielding materials, so the application-specific apparatus might detect these shielding materials and send resultant data suggesting the presence of hazardous materials. This comprehensive analysis ensures that appropriate actions can be taken to mitigate risks associated with the transportation of hazardous materials.

If the RF detection device 102 were to be integrated with an airport baggage screening system at security checkpoints and checked luggage scanners may detect explosives like SEMTEX, dynamite, and HMX, chemical threats such as hydrogen peroxide, TATP, and ammonium perchlorate, and contraband including illegal substances, undeclared lithium batteries, and hazardous liquids. In public transportation security, integration with a passenger and cargo screening portal at train stations and bus terminals may detect explosives like ANFO, picric acid, and urea nitrate, chemical agents such as phosgene, chlorine gas, and hydrofluoric acid, and biological threats like smallpox, tularemia, and plague. In event security, integration with a portable screening unit at concert venues and sports arenas may detect explosives like TATP, ANFO, and HMTD, weapons including concealed firearms and knives, and narcotics such as synthetic cannabinoids, opiates, and hallucinogens. In industrial facilities, integration with a hazardous material detection system in chemical plants and pharmaceutical manufacturing may detect industrial chemicals like benzene, formaldehyde, and toluene, toxic gases such as carbon monoxide, hydrogen sulfide, and sulfur dioxide, and contaminants including heavy metals, toxic solvents, and radioactive isotopes. In mining operations, integration with a mine safety monitoring system in underground and surface mines may detect explosives like ammonium nitrate, dynamite, and ANFO, toxic gases such as methane, carbon monoxide, and hydrogen sulfide, and radioactive materials including radon, uranium, and thorium. In food and agriculture, integration with a contaminant detection system in food processing plants and agricultural storage may detect chemical contaminants like pesticides, herbicides, and fungicides, biological threats such as bacterial toxins, molds, and mycotoxins, and radioactive contaminants including cesium-137, strontium-90, and iodine-131. In healthcare facilities, integration with a hospital safety monitoring system in medical storage and emergency rooms may detect chemical hazards like formaldehyde, glutaraldehyde, and ethylene oxide, radioactive materials such as iodine-131, technetium-99m, and cesium-137, and biological agents including anthrax, botulinum toxin, and ricin. In construction sites, integration with a safety compliance system at building and demolition sites may detect asbestos, lead, and chemical hazards like solvents, adhesives, and other construction chemicals. In research laboratories, integration with a safety monitoring system may detect radioactive isotopes, toxic chemicals, and biological samples. In environmental monitoring, integration with a detection system may detect pollutants like benzene, toluene, and xylene, hazardous gases such as methane, sulfur dioxide, and nitrogen dioxide, and heavy metals in soil. Integration considerations include ensuring that the integration connection apparatus facilitates real-time data sharing between the RF detection device 102 and the application-specific apparatus to enhance threat detection responsiveness and accuracy, developing automated response protocols for each integrated device, designing intuitive user interfaces to provide clear, actionable information to operators, and ensuring that integrated devices can operate in various environmental conditions. Integrating the RF-specific material detection device into these specific application devices may significantly enhance safety, efficiency, and accuracy of hazardous material detection across multiple industries.

FIG. 5 is a flow chart of a method performed by the reporting module 156. The reporting module 156 may be initiated at step 500 by the base module 150. The reporting module 156 may receive at step 502 material identification or identification from the base module 150. For example, the base module 150 may send data that anthrax was identified. The reporting module 156 may send at step 504 the material identification or identifications to the apparatus module 168. The reporting module 156 may format the data to comply with the format of the application-specific apparatus 162. The reporting module 156 may return at step 506 to the base module 150.

FIG. illustrates the material database 158. The material database 158 may contain a list of materials and their associated resonance frequencies. These resonance frequencies are the frequencies of electromagnetic waves emitted from the transmitter antenna 120 that produce a response from the material that can be received by the receiver unit 124. The frequency at which an element resonates may be based on the number of protons, number of neutrons, and/or atomic mass (sum of protons and neutrons) for the element. For example, the selected frequencies for Arsenic (As) may be 33 Hz (based on number of protons), 42 Hz (based on number of neutrons), and 75 Hz (based on atomic mass). These frequencies can also be increased by one or more orders of magnitude (10×, 100×, etc.). Similarly, the frequencies for a material may be based on the sum total of the constituent parts. For example, a Hydrogen Peroxide ($H_2O_2$) molecule has a combined total of 18 protons (corresponding to a frequency of 18 or 180 Hz) and a mass of 34 (corresponding to a frequency of 34 or 340 Hz). Individual scans using two or more of these frequencies can be used to uniquely identify the element or material. Note that these frequencies are examples. The actual frequencies at which materials and elements resonate may be determined by physics models and/or experimentation. The material database may further contain priority tiers for specific applications. These priority tiers may determine in which order frequencies are selected for testing. For example, application A may be a cargo crane application wherein Uranium and Cocaine might be a high priority due to being heavily regulated materials, where $H_2O_2$ might be used to make explosives but also has many legal uses. For another example, application B may be a mail room loading dock wherein Uranium and Nitroglycerin ($CH_2NO_3CH_2NO_3CH_2NO_3$) are high priority due to the damage they can cause to others. Anthrax, while still deadly, may be better detected by a closer, more sensitive device. For another example, application N may be a mail or luggage handling system wherein small chemical agents like Arsenic and Anthrax are high priority. Other hazards like Uranium and Nitroglycerin should have already been detected by other methods if they were in any significant amounts and so are lower priority.

Figure 7:
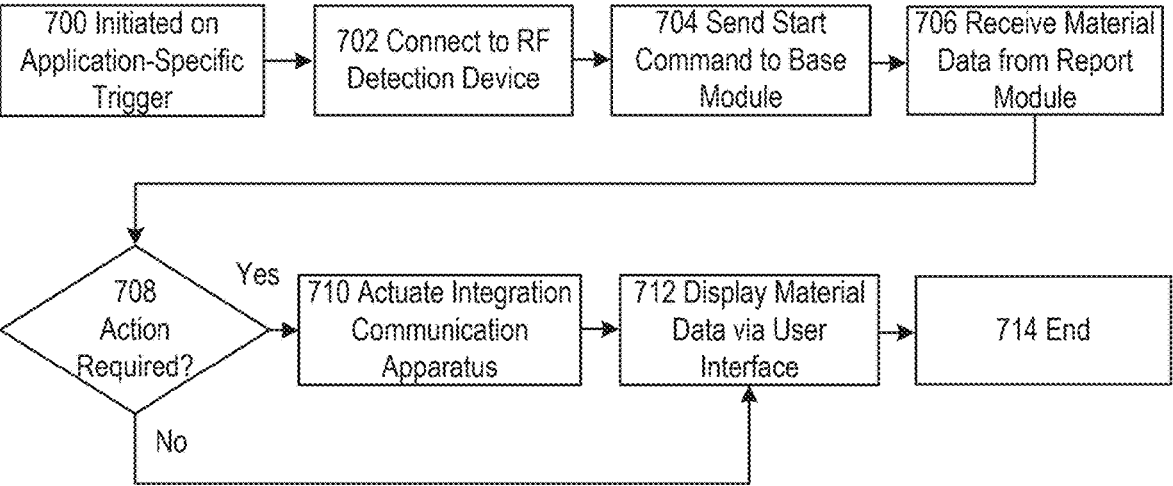
FIG. 7 is a flow chart of a method performed by an Apparatus Module, according to an embodiment.

FIG. 7 is a flow chart of a method performed by the apparatus module 168. The apparatus module 168 may be initiated at step 700 by an application-specific trigger. The nature of this trigger depends on the specific application of the application-specific apparatus 162. For a cargo crane, this trigger may be the coupling of the crane to a cargo container. For a loading dock, this trigger may be the detection of an incoming truck. For a handling system, this trigger may be a piece of mail or luggage passing into a detection area. The apparatus module 168 may connect at step 702 to the RF detection device 102 via the integration connection apparatus 160. The apparatus module 168 may send at step 704 a start command to the base module 150. This command tells the base module 150 to proceed through the detection process. The apparatus module 168 may receive at step 706 material identification or identifications from the report module 156. For example, the report module 156 may report that anthrax was identified. The apparatus module 168 may determine at step 708 if action is required. Whether or not action is required is an application and material specific inquiry. For example, a cargo crane may not require an action when illegal drugs are found because they represent no immediate hazard, but an alarm may need to be triggered when nuclear materials are found for the safety of dock workers. For another example, at a loading dock, explosive materials may require that the loading dock gate be shut or kept shut. For another example, a mail or luggage handling system may be shut down when biological or chemical weapons are found, but ballistic weapons like handguns do not require physical action; only an administrator to be informed. If no action is required, the apparatus module 168 may skip to step 712. If an action is required, the apparatus module 168 may actuate at step 710, the integration communication apparatus 166. The integration communication apparatus 166 may perform some physical function of the application-specific apparatus 162. For example, for a cargo crane, the integration communication apparatus 166 may be an alarm which may be activated when a hazardous material is detected in a cargo container. For another example, for a loading dock, the integration communication apparatus 166 may be the gate opening mechanism, which may close the gate and prevent it from opening when explosives are detected in a delivery truck. For another example, for a handling system, the integration communication apparatus 166 may be a mechanical arm that redirects the problem package or luggage into a quarantine zone when chemical weapons are detected. The apparatus module 168 may display at step 712 the material identification or identifications via the user interface 164. This may be performed on a display device 172 associated with the RF detection device 102 (e.g., cell phone or tablet). The apparatus module 168 may also display any actions taken in step 710. Operators of the application-specific apparatus 166 may use this information to respond to hazards manually. The apparatus module 168 may end at step 714.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A method of triggering application-specific actions, the method comprising:

detecting an application-specific trigger for an application-specific apparatus;

accessing a material database that stores information regarding a set of materials, wherein each of the materials is associated with a particular transmission frequency at which a resonance with the material is known to occur;

transmitting an RF signal via a first antenna into a target associated with the application-specific apparatus, the RF signal transmitted at the particular transmission frequency corresponding to one or more of the set of materials;

receiving an RF response signal from the target;

transmitting a localized oscillating magnetic field via a second antenna into the target;

detecting a magnetic resonance effect in response to the localized oscillating magnetic field;

analyzing a composite signature including the magnetic resonance effect and the RF response signal for resonance characteristics indicating that at least one of the materials is present in the target;

determining an application-specific action to actuate based on the indicated material; and actuating at least one integration communication apparatus associated with the application-specific apparatus to perform the application-specific action.

2. The method of claim 1, wherein the application-specific apparatus includes a cargo crane, and wherein the application-specific trigger includes a coupling of the cargo crane to a cargo container.

3. The method of claim 1, wherein the application-specific apparatus includes a loading dock, and wherein the application-specific trigger includes a truck approaching the loading dock.

4. The method of claim 1, wherein the application-specific apparatus includes a mail-handling system, and wherein the application-specific trigger includes a piece of mail passing through the mail-handling system.

5. The method of claim 1, wherein the application-specific apparatus includes a luggage-handling system, and wherein the application-specific trigger includes a piece of luggage passing through the luggage-handling system.

6. The method of claim 1, wherein the at least one integration communication apparatus includes an alarm, and further comprising identifying that the material indicated as being present in the target is a hazardous material, wherein the application-specific action includes activating the alarm in response to the hazardous material being detected in the target.

7. The method of claim 1, wherein the at least one integration communication apparatus includes an automated gate, and further comprising identifying that the material indicated as being present in the target is a hazardous material, wherein the application-specific action includes closing the automated gate in response to the hazardous material being detected in the target.

8. The method of claim 1, wherein the at least one integration communication apparatus includes an automated gate, and further comprising identifying that the material indicated as being present in the target is not a hazardous material, wherein the application-specific action includes opening the automated gate in response to no hazardous material being detected in the target.

9. The method of claim 1, wherein the at least one integration communication apparatus includes a mechanical arm, and further comprising identifying that the material indicated as being present in the target is a hazardous material, wherein the application-specific action includes actuating the mechanical arm to redirect one of a package or luggage into a quarantine zone in response to the hazardous material being detected in the target.

10. The method of claim 1, wherein the application-specific action includes real-time data communications with one or more control systems regarding the material being detected in the target.

11. The method of claim 1, wherein the first antenna and the second antenna are part of a hybrid antenna array in which the first antenna is a dipole antenna and the second antenna is a loop antenna.

12. A system of triggering application-specific actions, the system comprising:

memory including a material database that stores information regarding a set of materials, wherein each of the materials is associated with a particular transmission frequency at which a resonance with the material is known to occur;

an antenna array that includes:

a first antenna configured to transmit an RF signal into a target, the RF signal transmitted at the particular transmission frequency corresponding to one or more of the set of materials and to receive a response signal from the target, and a second antenna configured to transmit a localized oscillating magnetic field into the target and to detect a magnetic resonance effect in response to the localized oscillating magnetic field;

an application-specific apparatus including an integration communication apparatus; and one or more processors that execute instructions stored in a non-transitory computer-readable medium, wherein the one or more processors execute the instructions to:

detect an application-specific trigger for the application-specific apparatus;

access the material database;

analyze a composite signature including the magnetic resonance effect and the RF response signal for resonance characteristics indicating that one of the materials is present in the target;

determine an application-specific action to actuate based on the indicated material; and actuate the integration communication apparatus associated with the application-specific apparatus to perform the application-specific action.

13. The system of claim 12, wherein the application-specific apparatus includes a cargo crane, and wherein the application-specific trigger includes a coupling of the cargo crane to a cargo container.

14. The system of claim 12, wherein the application-specific apparatus includes a loading dock, and wherein the application-specific trigger includes a truck approaching the loading dock.

15. The system of claim 12, wherein the application-specific apparatus includes a mail-handling system, and wherein the application-specific trigger includes a piece of mail passing through the mail-handling system.

16. The system of claim 12, wherein the application-specific apparatus includes a luggage-handling system, and wherein the application-specific trigger includes a piece of luggage passing through the luggage-handling system.

17. The system of claim 12, wherein the integration communication apparatus includes an alarm, wherein the processors execute further instructions to identify that the material indicated as being present in the target is a hazardous material, and wherein the application-specific action includes activating the alarm in response to the hazardous material being detected in the target.

18. The system of claim 12, wherein the integration communication apparatus includes an automated gate, wherein the processors execute further instructions to identify that the material indicated as being present in the target is a hazardous material, and wherein the application-specific action includes closing the automated gate in response to the hazardous material being detected in the target.

19. The system of claim 12, wherein the integration communication apparatus includes an automated gate, wherein the processors execute further instructions to identify that the material indicated as being present in the target is not a hazardous material, and wherein the application-specific action includes opening the automated gate in response to no hazardous material being detected in the target.

20. The system of claim 12, wherein the integration communication apparatus includes a mechanical arm, wherein the processors execute further instructions to identify that the material indicated as being present in the target is a hazardous material, and wherein the application-specific action includes actuating the mechanical arm to redirect one of a package or luggage into a quarantine zone in response to the hazardous material being detected in the target.

21. The system of claim 12, wherein the application-specific action includes real-time data communications with one or more control systems regarding the material being detected in the target.

\* \* \* \* \*